US006415267B1

(12) United States Patent
Hagan

(10) Patent No.: US 6,415,267 B1
(45) Date of Patent: Jul. 2, 2002

(54) SYSTEM FOR MONITORING INCREASING INCOME FINANCIAL PRODUCTS

(76) Inventor: Bernard P Hagan, 1960 Broadway, San Francisco, CA (US) 94109

( * ) Notice: Subject to any disclaimer, the term of this patent is extended or adjusted under 35 U.S.C. 154(b) by 86 days.

(21) Appl. No.: 09/617,071

(22) Filed: Jul. 17, 2000

Related U.S. Application Data

(63) Continuation-in-part of application No. 09/412,836, filed on Oct. 5, 1999, which is a continuation-in-part of application No. 09/327,728, filed on Jun. 8, 1999, now Pat. No. 6,061,661.

(51) Int. Cl.⁷ .............................................. G06F 17/60
(52) U.S. Cl. .......................................... 705/35; 705/36
(58) Field of Search ................................ 705/4, 35, 36, 705/1

(56) References Cited

U.S. PATENT DOCUMENTS

| | | | | |
|---|---|---|---|---|
| 4,642,768 A | * | 2/1987 | Roberts ........................ | 705/35 |
| 4,722,055 A | * | 1/1988 | Roberts ........................ | 705/36 |
| 4,752,877 A | * | 6/1988 | Roberts et al. ................ | 705/35 |

(List continued on next page.)

FOREIGN PATENT DOCUMENTS

| | | |
|---|---|---|
| WO | WO 00/77673 A2 * | 12/2000 |
| WO | WO 01/25988 A1 * | 4/2001 |

OTHER PUBLICATIONS

Jacobs et al, "Market–Neutral Strategy Limits Risk", Pension Management, vol. 31, No. 7, p. 39, Jul. 1995.*
Ghouls' Pools, by S. Kichen, Forbes, Mar. 16, 1992, p. 19 (1 page).

(List continued on next page.)

Primary Examiner—James P. Trammell
Assistant Examiner—John W. Hayes
(74) Attorney, Agent, or Firm—Robert C. Kain, Jr.; Fleit Kain

(57) ABSTRACT

The present invention relates to an increasing income financial product. According to one embodiment of the invention, each subscriber invests in a financial contractual product or program. Each subscriber designates primary and secondary beneficiaries. The subscriber has various payment plan options to fund the financial product. Those plans include (a) lump sum payment, (b) periodic payments, (c) a pledge of a subscriber's financial asset, and (d) a pledge of a subscriber's financial asset accompanied with periodic payments. The primary beneficiary is assigned, along with a number of demographically similar beneficiaries, to a certain contract group. In the event the subscriber utilizes the pledge payment plan, when the primary beneficiary dies, the pledged assets of the subscriber are placed under the control of the financial product administrator or its designee. Income is provided according to the contractual terms or parameters to surviving primary beneficiaries of the same assigned contract group on an increasing, survivorship basis until (a) all the initial primary beneficiaries die; or (b) a predetermined percentage of the primary beneficiaries die; (c) the contract expires based upon the expiration of pre-established time periods; or (d) upon any other contractually defined event. Alternatively, the increasing income may be paid to the surviving members based upon mortality tables. When the contract expires, the surviving primary beneficiaries (the percentage initially established per the financial product contract) or the designated secondary beneficiaries receive their pro rata share of the principal from the contract group. In one embodiment, the financial product is configured as a self-directed financial investment wherein the subscriber/primary beneficiary identifies the type of self directed investment structure suitable to him or her and compatible with the designated contract group.

37 Claims, 18 Drawing Sheets

U.S. PATENT DOCUMENTS

| | | | |
|---|---|---|---|
| 5,291,398 A | * 3/1994 | Hagan | 705/35 |
| 5,592,379 A | 1/1997 | Finfrock et al. | 395/239 |
| 5,631,828 A | 5/1997 | Hagan | 395/204 |
| 5,864,685 A | 1/1999 | Hagan | 395/235 |
| 5,893,071 A | * 4/1999 | Cooperstein | 705/4 |
| 5,933,815 A | 8/1999 | Golden | 705/35 |
| 6,061,661 A | 5/2000 | Hagan | 705/35 |
| 6,161,096 A | * 12/2000 | Bell | 705/35 |
| 6,330,541 B1 | * 12/2001 | Meyer et al. | 705/36 |

OTHER PUBLICATIONS

Anonymous, "Private Investment Companies: A New Business Opportunity for Banks," Trust Letter, vol. 373, pp. 1–3 (Dec. 1996).

Sages et al., "Considerations in Choosing a Common Investment Alternative," Trusts & Estates, vol. 133, No. 3, pp. 45–53 (Mar. 1994).

* cited by examiner

SYSTEM FOR MONITORING INCREASING INCOME FINANCIAL PRODUCTS

This is a continuation-in-part of U.S. patent application Ser. No. 09/412,836, filed Oct. 5, 1999, now pending which is a continuation-in-part of U.S. Pat. No. 6,061,661, issued May 9, 2000, formerly, U.S. patent application Ser. No. 09/327,728, filed Jun. 8, 1999.

BACKGROUND OF THE INVENTION

The present invention relates to a method for electronically processing transactional data and monitoring funds invested in an increasing income financial product.

U.S. Pat. No. 5,864,685 to Hagan discloses an increasing income trust computer transaction system and an insured investment account system. This patent disclosure relates to a certain financial product wherein a subscriber purchases an annuity contract or an irrevocable trust and identifies a primary beneficiary for that contract or trust. The primary beneficiary may be the subscriber or may be another party. Primary beneficiaries having actuarially similar characteristics are grouped together. "The trust corpus is funded with the annuity contract principal and/or the annuity contract income of subscribers. Each of the primary beneficiaries (typically the subscribers themselves, but possibly other individuals) receives payments from the trust income. As each subscriber dies, the trust income is distributed to the remaining primary beneficiaries. When the last subscriber dies, the trust corpus is distributed proportionally to secondary beneficiaries, typically the heirs of the primary beneficiaries." Col. 3, lines 51–60. Accordingly, the system described in Hagan '685 utilizes a data processing method which involves determining when the subscriber dies, computing increasing income trust fund payments to surviving subscribers who are grouped together in the same actuarial group as the decedent, and distributing the corpus of the trust, on a prorata basis, to all secondary beneficiaries upon the death of all subscribers in the actuarial group.

U.S. Pat. No. 5,631,828 to Hagan discloses a method and a system for processing federally insured annuity and life insurance investments. U.S. Pat. No. 5,291,398 to Hagan discloses a method and a system for processing federally insured annuity and life insurance investments. U.S. Pat. No. 4,752,877 to Roberts et al.; U.S. Pat. No. 4,642,768 to Roberts and U.S. Pat. No. 4,722,055 to Roberts disclose computer systems which monitor financial products. These products fund future events or expenditures. For example, if a person wanted to fund the college education of his or her child, the Roberts system provides a financial product which is monitored and maintained by a computer which collects premium from subscribers, projects the future cost of a college education and invests the premium payments and requests additional premium payments in order to achieve the subscriber's goal, to wit, to pay for the college. Roberts' system also discloses the funding of retirement and nursing home expenditures.

None of the aforementioned prior art patents disclose certain important data processing features which establish the viability, growth and continued maintenance of an increasing income financial product.

SUMMARY

The present invention responds to administrative problems associated with an increasing income financial product and addresses deficiencies in the prior art. The data processing system and method according to a preferred embodiment of the present invention implements an investment account structure establishing and providing an increasing income financial product.

According to one embodiment of the invention, each subscriber invests in a financial contractual product or program. Each subscriber designates primary and secondary beneficiaries. The subscriber has various payment plan options to fund the financial product. Those plans include (a) lump sum payment, (b) periodic payments, (c) a pledge of a subscriber's financial asset, and (d) a pledge of a subscriber's financial asset accompanied with periodic payments. The primary beneficiary is assigned, along with a number of demographically similar beneficiaries, to a certain contract group. In the event the subscriber utilizes the pledge payment plan, when the primary beneficiary dies, the pledged assets of the subscriber are placed under the control of the financial product administrator or its designee. Income is provided according to the contractual terms or parameters to surviving primary beneficiaries of the same assigned contract group on an increasing, survivorship basis until (a) all the initial primary beneficiaries die; or (b) a predetermined percentage of the primary beneficiaries die; (c) the contract expires based upon the expiration of pre-established time periods; or (d) upon any other contractually defined event. Alternatively, the increasing income may be paid to the surviving members based upon mortality tables. When the contract expires, the surviving primary beneficiaries (the percentage initially established per the financial product contract) or the designated secondary beneficiaries receive their pro rata share of the principal from the contract group. In one embodiment, the financial product is configured as a self-directed financial investment wherein the subscriber/primary beneficiary identifies the type of self directed investment structure suitable to him or her and compatible with the designated contract group. The computer system monitors the return on investment (ROI) for the selected, self directed assets, rolls or pours excessive ROI into a supplemental account for the benefit of the subscriber/beneficiary, issues calls for more premiums from the subscriber in the event that the ROI does not meet contract ROI parameters, and otherwise monitors the account.

OBJECTS OF INVENTION

Thus, it is an object of the present invention to provide a data processing system and method for implementing and administering an investment account structure consisting of increasing income contracts whose commingled principal is invested in any legal investment.

It is a further object of the present invention to provide a data processing system and method for implementing an investment account structure consisting of contracts that pay out increasing income to the survivors (based upon actual mortality or estimated mortality) and whose principal is subsequently distributed to the heirs (or to surviving beneficiaries) upon expiration of the contract.

Another object is that the implementation provides minimum overhead charges and maximum security so that beneficiaries are fully informed regarding the increasing income feature. Therefore, the system provides periodic reports to subscribers or beneficiaries, advising them of their relative progress towards their goals. It also provides reports for system administration and auditing.

A further object of the present invention is to provide a self directed financial product wherein the subscriber, or his or her beneficiary, can select one or more investments or investment strategies and inject his or her investment strategies into the increasing income financial product described herein.

It is an additional object of the present invention to provide various, flexible payment plans for the subscriber to fund the increasing income financial product.

Yet other objects of the invention, its nature, and various advantages will be apparent from the accompanying drawings and the following detailed description of the preferred embodiments of the invention.

DESCRIPTION OF THE PREFERRED EMBODIMENTS

Figure 1:
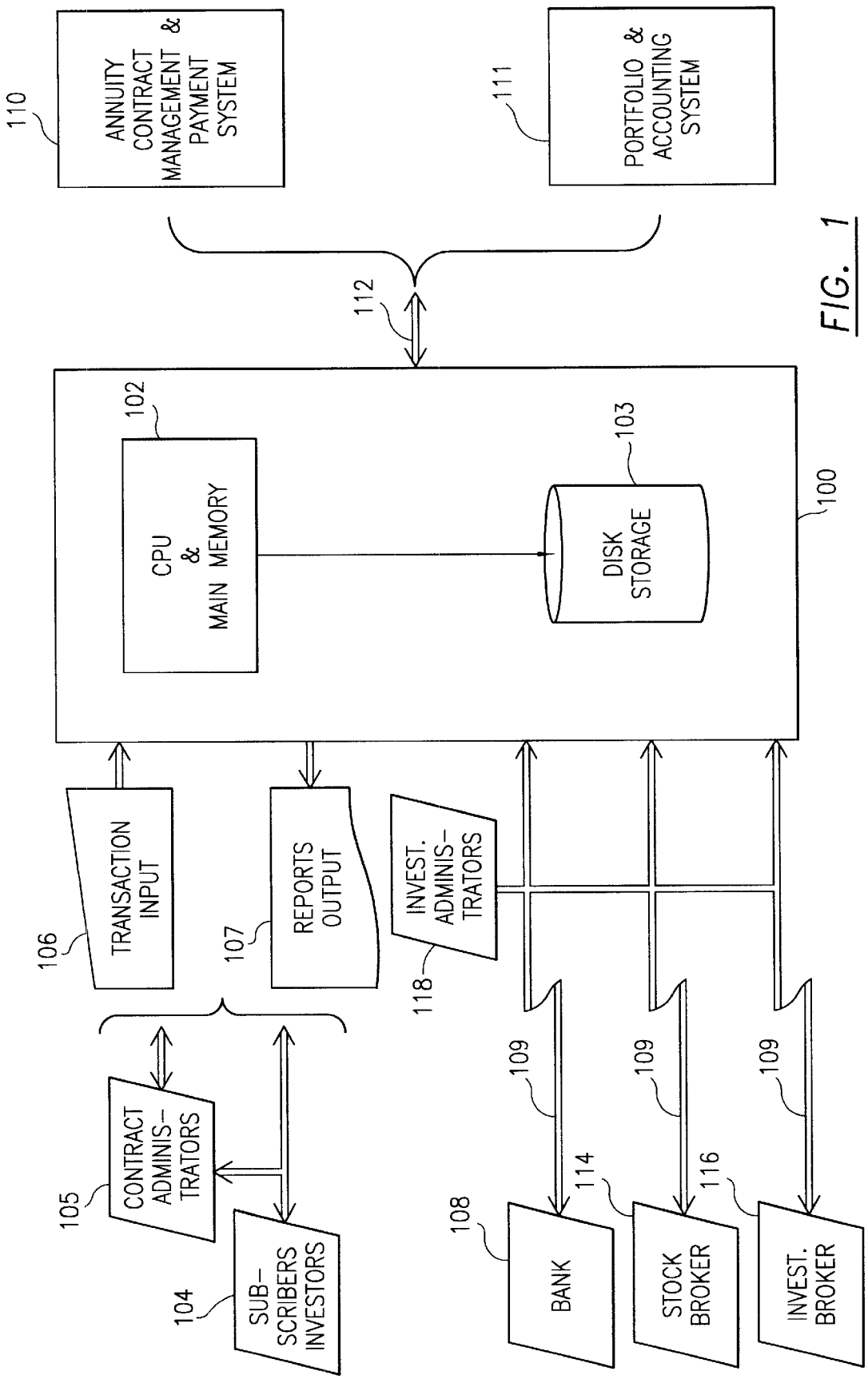
FIG. 1 is a schematic diagram depicting the flow of information using a data processing system or method according to the present invention.

The data processing system and method according to the present invention is depicted as part of the schematic diagram of FIG. 1. Computer 100 comprises central processing unit and main memory (CPU) 102 and disk storage 103. Computer 100 may be, for example, a single sufficiently powerful computer or a network of computers jointly having sufficient power.

Data and instructions that implement the process and method are stored in disk storage 103. The data are preferably maintained in entity records that include descriptive data as shown in Table 1. The data can be organized as files, relational databases, or other equivalent structures.

TABLE 1

Entity Record Typical Descriptive Data (1) Subscriber Record
Name; address; primary and secondary beneficiaries;
Actuarial or demographic data; contract group designation; contracts inchoate and owned;
Value of subscriber's total investment;
Percent principal (P) subscriber owns;
Net of all payments to and from the system.

(2) Contract Record
Owning subscriber; Contract terms or parameters; Payment history; Principal value.

(3) Increasing Income Record
List of all primary beneficiaries assigned to contract group; Payment history;
Principal value.

(4) Investment Record
Name; address; investment data (characteristics, return on investment (actual and prospective), risk rating); time frame for investment;
Net investment; income generated; management fee data.

(5) Economic Forecast Record
Current and projected economic data (6) System Record
Current date; Total value of the system;
Total income for this period; Redemption data;
Funds available to invest.

The instructions are processed by CPU 102 and are broken into cooperating modules. A preferred functional decomposition is listed in Table 2. The instructions can be written in procedural, database, object oriented, or other equivalent computer OS language.

TABLE 2

Functional Module Typical Functional Content (1) Storage maintenance
Creates storage areas on the storage media;
accepts transaction input data and updates storage areas;
deletes storage areas.

(2) Premium computation
Accepts inflation and interest rate forecasts;
computes premium to meet income target goal
specified in constant dollars; alerts administrator and/or subscriber if goal will not be met.

(3) Payment tracking
Accepts payment data from contract and
portfolio/accounting systems; computes each
subscriber's percentage ownership and funds
available for investment by the system administrator.

(4) Increasing income and principal payment
Computes increasing income; generates
orders to portfolio/accounting system to pay proportionate amount to surviving beneficiaries (5) Investment monitoring
Monitors investments to assure match with increasing income contract parameters; monitors economic conditions, return on investment (prospective and actual); generates orders to portfolio/accounting system to sell and/or buy if target values are not met.

(6) Investment
Invests funds available; generates orders to
portfolio/accounting system to buy the most attractive investments.

(7) Reporting
For each file or database, generates exception, detail and summary reports.

Alternative, equivalent organizations of data and instructions will be apparent to those skilled in this art.

The other elements of FIG. 1 depict the data flow environment of a system and method according to the invention. Subscribers or investors 104 typically correspond with administrators 105 who enter their requested transactions into the system. In a networked implementation, subscribers may deal directly with the system via home terminals. The administrators also enter transaction monitoring data and commands describing and directing investment in bank 108 (e.g. certificates of deposit), stock brokerages 114 (stocks, bonds), investment brokerages 116 (stocks, bonds, commodities, real estate) and investment contracts (described below), and are responsible for correct system functioning and auditing system transactions. Administrators 105 also handle and direct investments via investment administrators 118. In a large, widely held financial product system, investment administrators 118 may be investment advisors (e.g., Goldman, Sacks or Merill Lynch) or insurance companies (Aetna). The entering of transactions by administrator 105 is indicated at block 106, which could be a terminal or other input device. The system produces reports, as indicated at block 107, for administrators, subscribers and beneficiaries in any convenient output form (electronic, print or a combination). Investment administrators may also utilize similar inputs and outputs 106, 107.

The invention obtains data describing the investments in banks 108 and brokerage houses 114, 116 via communications link 109. Preferably, 109 is an automatic, telecommunications link. Alternatively, it could also require manual steps.

The system utilizes associated data processing subsystems that are known in the prior art but which are combined together herein in a unique, inventive manner. Contract management and payment system 110 is a subsystem for managing financial product contracts, receiving premium investments, making increasing income and principal payments, and tracking principal value. Portfolio and accounting system 111 is a subsystem for managing the investments, increasing income, and cash on hand. These subsystems may be implemented on computer 100. Alternatively, they may reside on a separate computer system communicating via communications link 112 with computer 100. In either implementation, contract system 110 receives from computer 100 data describing financial product contracts and sends to computer 100 data describing payment history and principal value of the contracts. Portfolio and accounting system 111 receives, from computer 100, data describing orders to buy or sell particular investments and sends, to computer 100, data describing income history and principal value of outstanding contracts and investments.

The following Abbreviations Table lists some abbreviations that are used herein.

Abbreviations Table

| | |
|---|---|
| 2d Ben. | secondary beneficiaries |
| $p | payment of pledged account |
| accum | accumulate |
| bar A | beneficiary A dies |
| demos. | demographics (a defined statistical grouping of human population, especially concerning vital statistics) |
| econ. | economic |
| exp. | expired |
| i | income or increasing income |
| ii | increasing income |
| incr. | increment, incremental, increase or increasing |
| invest. | investments |
| JTROS | Joint tenant with right of survivorship |
| K | contract - any legal contractual system in Financial Products Table |

-continued
Abbreviations Table

| | |
|---|---|
| max | maximum |
| mgt. | management, typically referring to management fee for operating system or managing money |
| min'm | minimum |
| P | principal |
| para. | parameters |
| pmt. | payment |
| pr | premium payment |
| prem | premium payment |
| Prime Ben. | primary beneficiaries |
| ROI | return on investment |
| sb | secondary beneficiary |
| Sub'r/inv'tr | subscriber - investor (may be any person or entity considered a primary beneficiary) |

An important feature of the present invention is to group primary beneficiaries (which may be subscribers purchasing the financial product) together into similar demographic groups and utilize a single financial product contract for that group such that (a) the financial product generates increasing income for the primary beneficiaries (in accordance with the contract terms); (b) the increasing income is based upon a "survival theory" that is, primary beneficiaries that live the longest get increasing income from the pooled principal of the entire contract group because other beneficiaries in the contract group die and the income is divided among fewer and fewer beneficiaries (for example, the income may increase due to the death of beneficiaries or may increase based upon mortality or actuarial tables (estimated mortality)); and, (c) when the contract expires per its terms (pre-established parameters), the principal is distributed to the surviving beneficiaries, or the subscriber's or primary beneficiary's heirs or the secondary beneficiaries. There are several variations of the financial product that are explained herein. These variations and the associated data processing method establish a viable and financially sound product for investors.

Several types of financial-contractual structures can be implemented to provide the increasing income product discussed herein.

Financial Product Table irrevocable trust
annuity
  life
  term of years (e.g., 5, 10, 15 yrs.)
  life plus survivor's life
  life plus survivor's life limited by term of years
life insurance
mutual find (closed end)
limited partnership
a contract
any other type of legal contractual structure embodying
  the financial concepts described herein The terms "subscriber" and "investor" generally refer to the individual or entity finding or paying the premiums for the increasing income financial product. However, the subscriber may or may not designate himself or herself as a primary beneficiary to receive the increasing income. The terms "subscriber" and "primary beneficiary" are sometimes used interchangeably herein. The contract is based upon a grouping of "primary beneficiaries" as described hereinafter. Typically, the "subscriber" is the person who funds the financial product and the "primary beneficiary" is a person or one of the people who receives the increasing income. As an added feature, the subscriber/primary beneficiary may change the secondary beneficiaries as permitted under law and in accordance with the contract terms of the financial product. Some of the contractually defined financial products do not permit the settler or initial subscriber or primary beneficiary to change other beneficiaries designated initially in the contract terms.

Loans to these entities may be available in a manner similar to loans secured by whole life insurance contracts.

The following table lists different types of primary beneficiaries.

Primary Beneficiaries Table individual subscriber/investor
other person designated by the subscriber
husband and wife with right of survivorship (JTROS)
two individuals legally recognized as being equivalent to husband and wife with right of survivorship (JTROS)

It is important to note that reference to "a primary beneficiary" may be construed to cover two individuals, i.e. a husband and wife, even though a singular term "primary beneficiary" is used herein. If the primary beneficiary covers two people, the "primary beneficiary" does not die until the last of the pair dies.

Also, it should also be noted that a closed end mutual fund is designated as a "contract" herein. The contract defines obligations and rights of (a) the financial product administrator; (b) the subscriber; and (c) the primary and secondary beneficiaries. It is believed that mutual funds have sufficient legal constraints contained therein and may be broadly classified herein as "contractual" in nature. Hence, the mutual fund is a "contract" as it relates to the increasing income financial product described herein.

Figure 2:
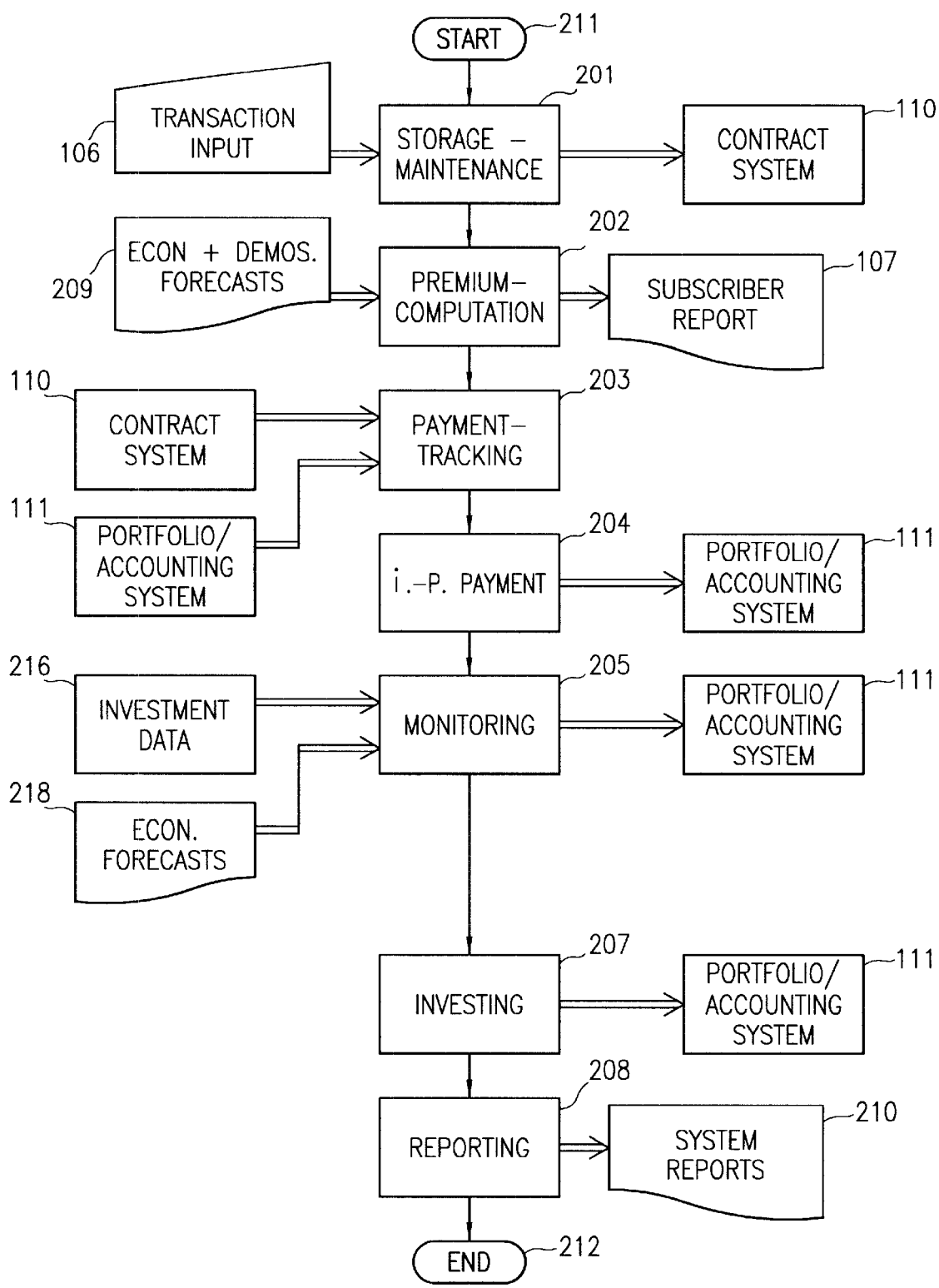
FIG. 2 is a flowchart of system functions as a data processing diagram according to the present invention.

FIG. 2 illustrates both the sequence of operations or method of a system according to the invention and the flow of external data into and out of the system. The function of processes at blocks 201 to 208 are described in Table 2, rows 1 to 7, respectively. If a system according to the present invention does not implement the economic analysis 209 feature, the economic analysis process in FIG. 7 (ROI exceeding contract parameter target) will not be present, nor will the pieces of any other process that are identified to process data representing economic analysis.

After one or more input transactions have been gathered as indicated at block 106, the system starts processing at block 211 and continues to storage maintenance process 201, where data is input to disk storage 103. After one or more transactions have been input at block 201, the succeeding processes, at blocks 202 to 208, are performed in the order illustrated. The system stops at block 212. Preferably, these processes would be performed at an appropriate interval, at least monthly but perhaps weekly or daily, depending on the frequency of transaction input, premium and income payments, and other system events. External data representing investments (prospective and existing) is input at function block 216. In a like manner, general economic data or forecast is input at block 218. This economic data includes, but is not limited to (a) consumer and manufacturer's price indices, (b) inflation, (c) interest rate, (d) stock and commodity indices and (e) other economic data generally relied upon to base an investment decision.

Figure 3:
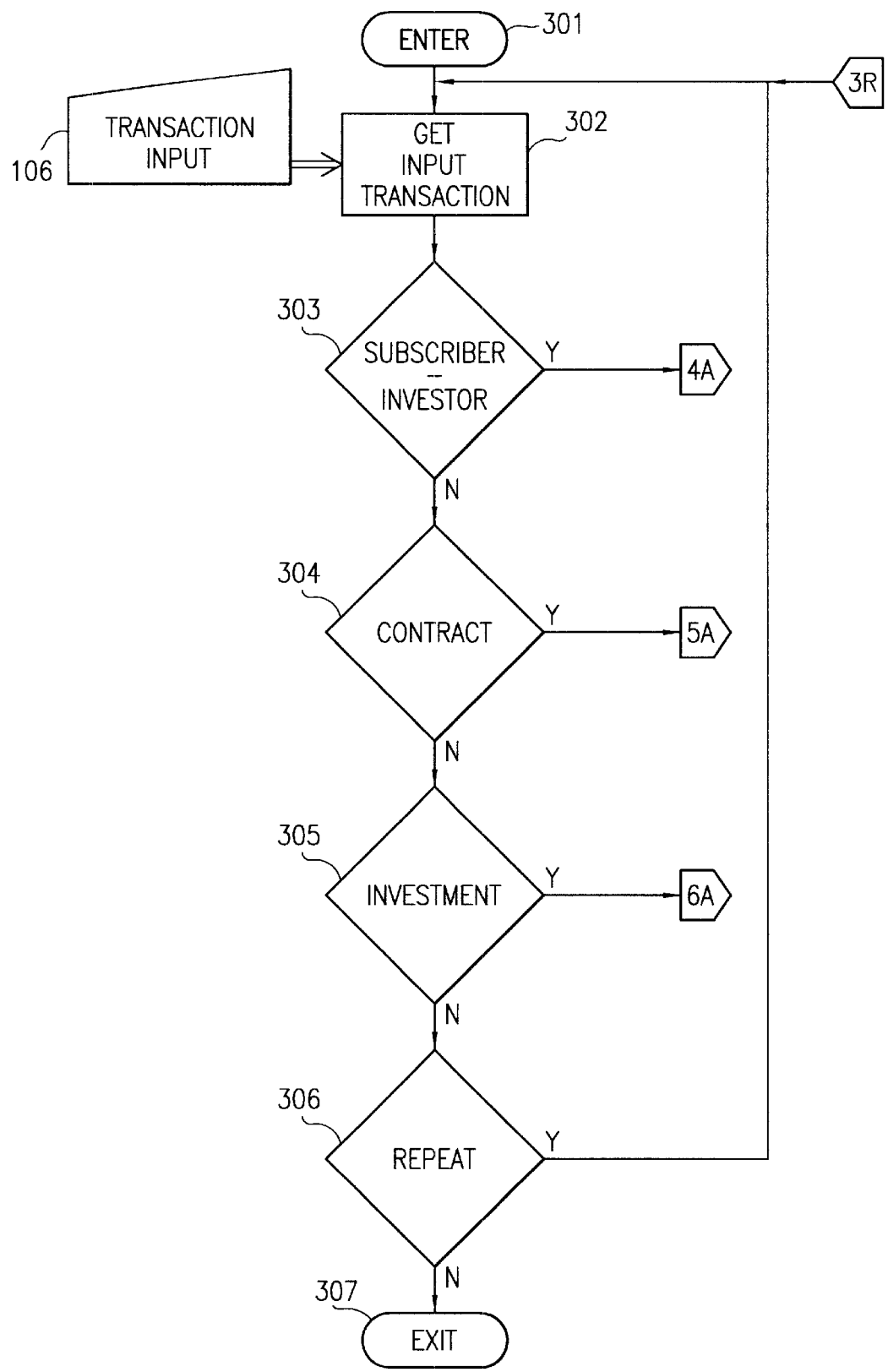
FIGS. 3, 4, 5, and 6 are flowcharts depicting storage maintenance processing systems, with FIG. 4 further depicting the system processing of subscriber transactions and FIGS. 5 and 6 further depicting contract and investment transactions systems.

A detailed description of the storage maintenance means is depicted in FIG. 3. Storage maintenance means processing begins at block 301 and ends at block 307, after which the system proceeds to the next sequential process. Transaction data is input as indicated at block 106 for processing at block 302. At block 303, the system checks if the transaction is for a subscriber. If so, processing proceeds, as indicated label 4A, to continue as described in FIG. 4. If not, as indicated at blocks 304 and 305, the system checks for contract or investment transactions, respectively, and proceeds, as indicated at labels 5a or 6a, respectively, to continue as described in FIGS. 5, 6. If the administrator requests a repeat, as indicated at block 306, the system will branch to data input at block 302, else storage maintenance processing exits at block 307.

Figure 15:
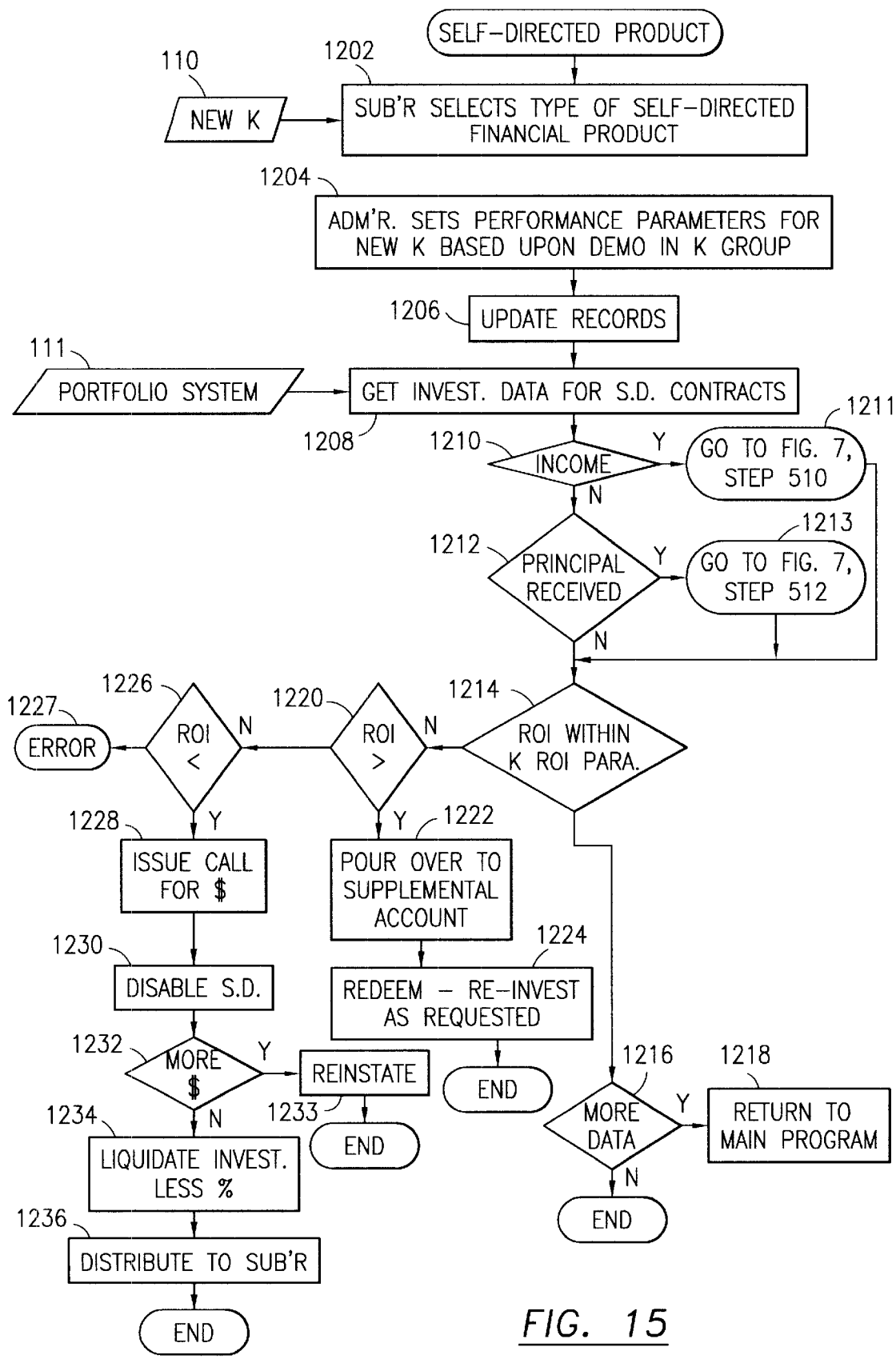
FIGS. 15 and 16 diagrammatically illustrate flow charts for the self directed financial product system in accordance with the principles of the present invention.
Figure 16:
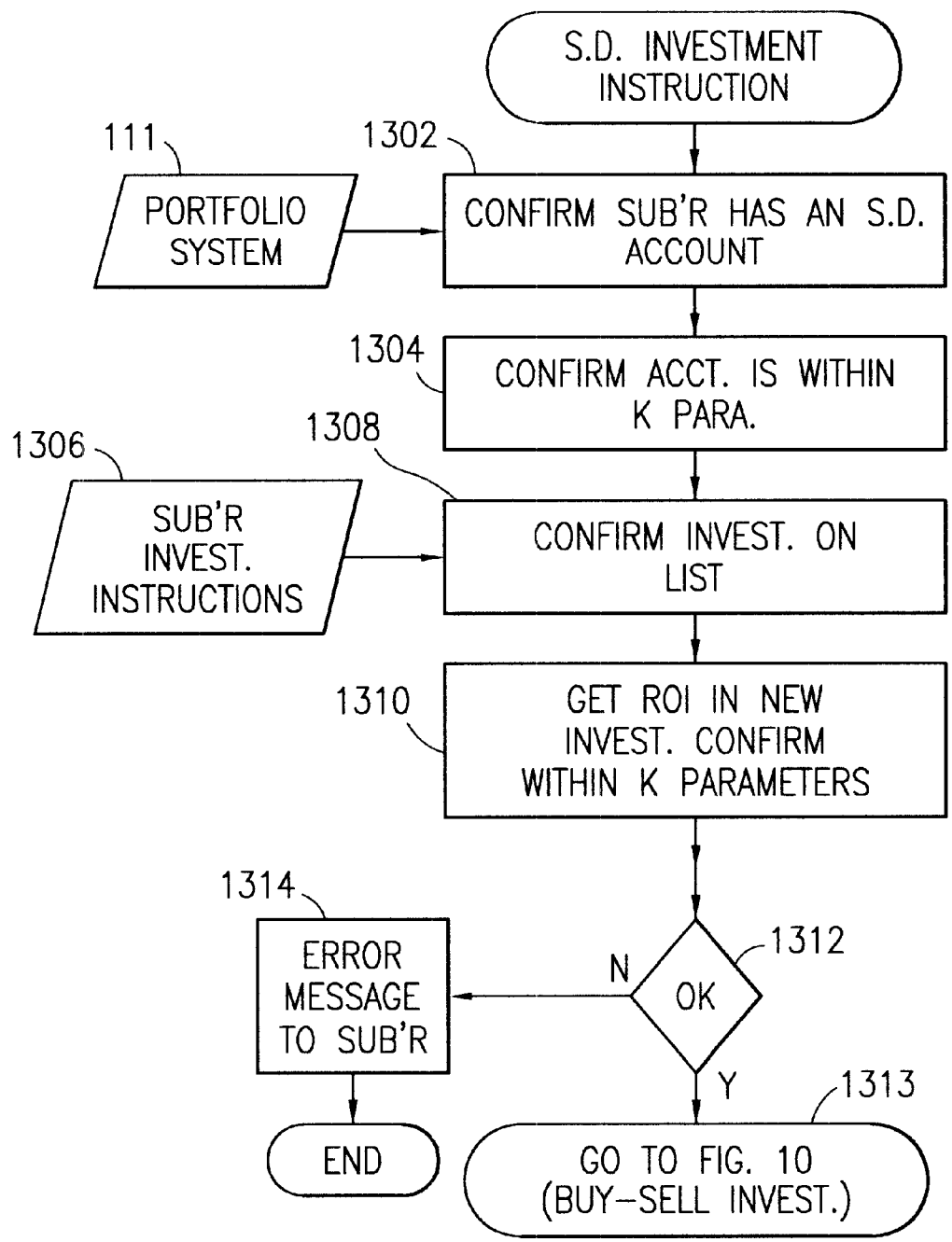

With respect to the self directed (SD) financial product data processing system shown in detail in FIGS. 15 and 16, if the subscriber selects an SD product, the system jumps at block 304 (FIG. 3) to FIG. 15. If the subscriber/beneficiary chooses a new investment for an SD product, the system jumps from block 305 (FIG. 3) to FIG. 16. Further, the SD system effects the processing of data, reports and funds in FIG. 7 at the portfolio and accounting input and encompassing steps 505, 506, 507 and 508.

Figure 4:
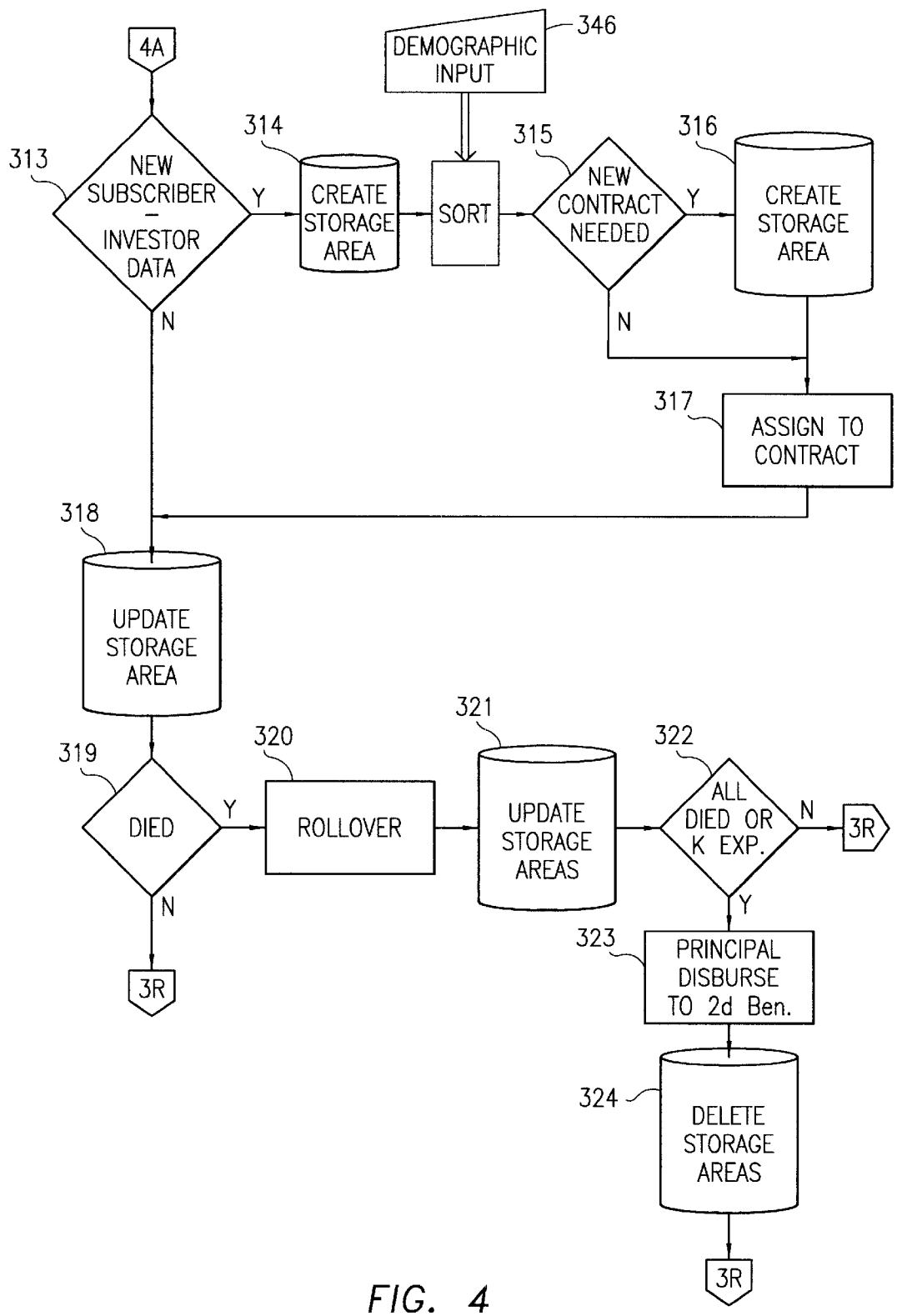

Now referring to FIG. 4, if a subscriber or investor transaction has been input, at block 313 the system checks for a new subscriber. If so, then a new storage area for this subscriber is created at block 314 to contain data similar to that listed in Table 1, row 1. This data includes designating primary and secondary beneficiaries. Other data may be required as set forth below. The new primary beneficiary must be assigned to a contract. Herein, reference is sometimes made to assignment or segregating beneficiaries into contract groups. Sort function 344 represents this segregation by demographic characteristics. Necessary external data input is obtained at block 346. At block 315, the system checks if a new contract is needed, and if so a new storage area for this contract is created at block 316 to contain data similar to that listed in Table 1, row 3 and as set forth herein. The system assigns the beneficiary to a group at block 317. The process indicated at block 318 updates these new storage areas.

Characteristics of Contract Group

Age (e.g., year of birth (single year bracket), multiple age brackets (e.g., 2 year age brackets, 5 year age brackets or multi-year grouping))
Sex married—unmarried—divorced or separated
Race (if legally considered non-discriminatory)
Ethnic Background (if legally considered non-discriminatory)
Residence (city, state, region and/or country)
Health (potentially requiring a health certificate executed by a professional)
Smoker/non-smoker During the development of the increasing income financial product, it was noted that there may be times when the financial product administrator would accept finds from a subscriber (associated with a designated primary beneficiary) but the administrator did not currently have an "open" increasing income contract for that primary beneficiary. In other words on a simplistic basis, the increasing income financial product does not operate properly until a reasonably large number of primary beneficiaries (supported by funds from subscribers) are gathered together in a singular contract group. Accordingly, contract inception parameters are necessary to assure the viability or financial health of the increasing income financial product. For example, the administrator may determine, based upon a subscription unit value of $10,000.00 (minimum premium) that at least 100, but not more than 500 primary beneficiaries must be assigned to a particular contract group represented by a respective contract. Accordingly, the inception parameter for that contract would be either 100 primary beneficiaries or $1,000,000.00. The $1,000,000.00 financial pool minimum is based upon a minimum investment criteria established with the advice of investment administrators 118. The term "inception" as used herein refers to the beginning of an obligation, on the part of the administrator, to pay increasing income based upon contractually established events or parameters to primary beneficiaries in a certain contract group. These contractually established events may be actual mortality, estimated mortality from actuarial tables or any other defined event. In other words, the "inception" refers to the period wherein the primary beneficiaries could, under some possibility, receive increasing income. If the increasing income is delayed for a predetermined number of years or during a "quiet time" when no primary beneficiary receives any "increasing" income, the "inception date" for the respective contract and contract group begins at the beginning of the quiet period.

In a similar manner, the administrator does have financial obligations to subscribers who have provided funds to purchase the increasing income product prior to the inception of the increasing income period pursuant to the contract. Of course, if the contract does not become "effective" until 100 primary beneficiaries are identified and funded by subscribers, the administrator must refund or return earlier subscriber's funds in the event the respective contract does not enter into its "inception phase" due to an insufficient number of subscribers/primary beneficiaries for that designated contract group. A time period may be associated with this "refund period" prior to inception of the contract. These contracts are called herein "inchoate contracts."

In the event the administrator accepts funds from a subscriber and the system does not have an "open" contract, the funds are placed in escrow, information regarding the funds and potential new increasing income contracts are placed in storage area 316 until the minimum number of subscribers/primary beneficiaries is obtained for that increasing income contract. At that point in time, the inception period for the increasing income contract begins, the contract is "open" and the previously identified and sequestered funds are thereafter released for investment purposes by the administrator. In an advanced system, the sequestered funds may be conservatively invested. When the contract is "open," beneficiaries' rights are no longer inchoate.

In a popular demographic group, the new subscriber/ primary beneficiary may cause an unacceptably large number of beneficiaries for a particular contract group. In other words, if adding the proposed beneficiary to the existing contract group (n+1) exceeds a predetermined maximum number of beneficiaries or a predetermined total dollar amount for that contract (for example, $10,000,000.00), the contract is "closed" and the proposed primary beneficiary/ subscriber must be designated for another increasing income contract. These contractual conditions are called "closure parameters" herein. This may result in activating the inception parameter conditions prior to opening a second increasing income contract for that proposed beneficiary. Closure parameters include (a) a maximum number of primary beneficiaries in a contract group and/or (b) a total monetary limit associated with the particular increasing income contract for a respective contract group. Other contract closure parameters may be specified in the increasing income contract such as external economic consideration (interest rate exceeding a predetermined annual amount) or civil disruption or commotion, war, or other factors identifiable in the increasing income contract. The New Contract Inquiry Parameter Table set forth below identifies some critical concepts.

New Contract Inquiry Parameters no match beneficiary age with existing contract or contract group having similar age parameters n+1 is less than minimum beneficiaries for a contract group n+1 exceeds maximum beneficiaries for selected contract new beneficiary does not match other contract group characteristics for any open contracts (sex, age, race, health (good or predetermined health condition (e.g. terminally ill with a certain disease))

It should be noted that the increasing income financial product may be sold not only to healthy individuals (beneficiaries) but also individuals who are subject to certain diseases, especially terminal diseases. For example, based upon the demographics and survival characteristics of persons with Acquired Immune Disease Syndrome (AIDS), the increasing income financial product may be particularly attractive. A key concept in the viability of the financial product is the theory that the beneficiary, designated by the subscriber, will survive a longer period that other similarly situated beneficiaries. Particularly, healthy individuals will make more money from the increasing income product as compared with less healthy individuals. However, since health is a relative concept, terminally ill patients such as AIDS patients, may readily participate under the theory that if they do survive a long period of time, they will be financially rewarded. This may provide an incentive to comply with aggressive medical treatment. In such a situation, a physician's certificate certifying that the primary beneficiary has a certain health condition would be appropriate. Further, the demographic input in block 346 is meant to encompass changing survival rate data and factors from the general populace which may affect the inception or closure of a particular contract group for an increasing income financial product. The administrator may be contractually permitted to "close" the contract group based upon demographic or survival rate data without resort to fixed a number of participants or time factors.

The New Contract Inquiry Parameter Table set forth above identifies some major concepts regarding whether or not a new increasing income contract is necessary based upon a proposed primary beneficiary designated by a paying subscriber.

Process at block 317 assigns the new subscriber to a contract, that consists of up to approximately 200 other subscribers/beneficiaries with similar demographic or actuarial characteristics and equal investments. Other participation limits may be established. This grouping of beneficiaries may be done by consulting mortality tables indexed by the chosen actuarial characteristics and picking only subscribers/beneficiaries with expected time until death in a fixed narrow range. For example, a given financial product contract may contain only subscribers with expected time to death of 30 years to 30 years and six months and investments of $500,000. Another contract group may have minimum investment units of $10,000.00 but the inception criteria may be set at 500 subscribers or beneficiaries.

At block 319, the system checks for a transaction indicating the death of a beneficiary or expiration of the contract.

If not, subscriber transaction processing is complete. See return 3R to FIG. 3. If so, then this beneficiary's remaining principal must be rolled over into the assigned contract group principal by the process at block 320. By rolling over the principal, all future income from the contract group principal is paid to survivors in the group. This requires increasing income and contract storage area update at block 321. This event also results in higher income payments being made to the remaining primary beneficiaries or subscribers.

The system performs a further test at block 322 by fetching all the subscriber/beneficiary storage areas assigned to the contract updated at blocks 320 and 321 and checks to determine if the designated beneficiaries have all died or if the contract has expired by its terms. Contract expiration may be triggered based upon a number of predefined events, including but not limited to the death of a predetermined number of primary beneficiaries. If not, processing is complete, and the system returns, as indicated at label 3R, to continue as indicated in FIG. 3. If so, then this contract must be terminated, as indicated at block 323; specifically, the contract principal is distributed ratably to the ultimate beneficiaries (surviving primary beneficiaries and decedents' secondary beneficiaries) specified by the subscriber areas tested at block 322. This is the expiration of the contract. Then, at block 324, all data areas for this contract and these subscribers are deleted from the storage means.

Contract Expiration Table

Figure 5:
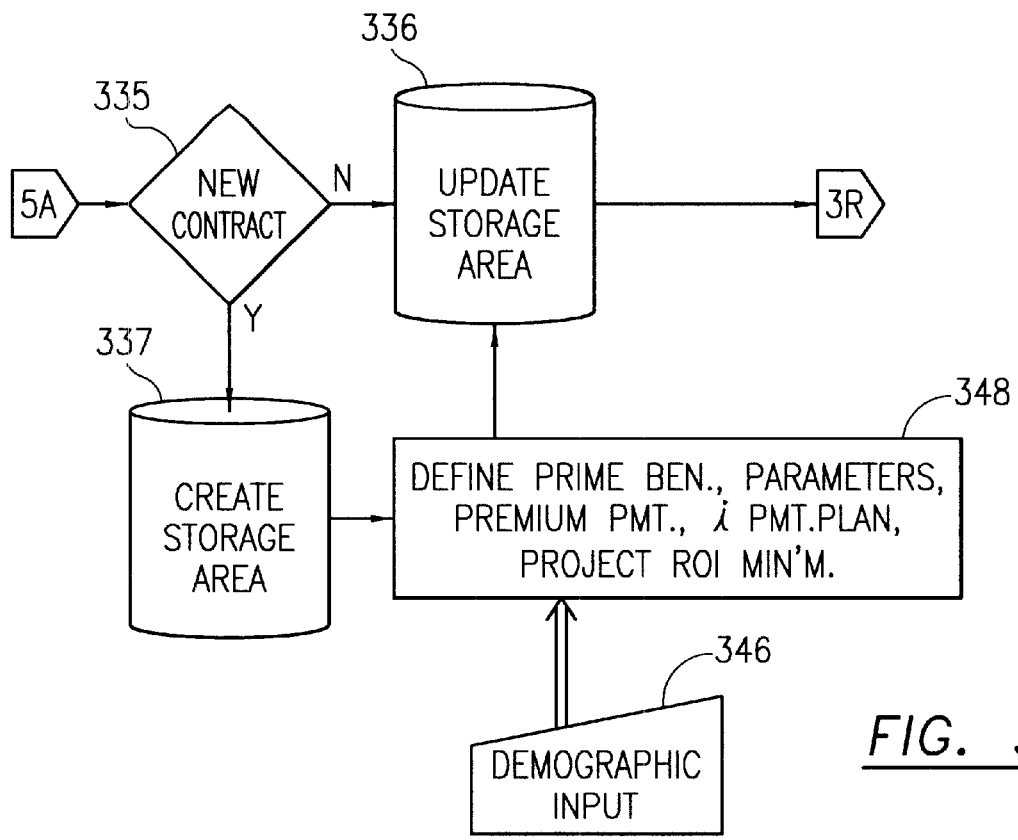

Contract expires when:
    all subscribers/investors in contract group die
    set term of years from inception or closure of contract
    the earlier of a set date or a term of years after inception or closure of a contract
    upon the occurrence of any other predetermined, contractually identified event or events
    upon the death of a predetermined number of primary beneficiaries Turning now to FIG. 5, if a contract transaction has been detected, processing continues at connector 5A. At block 335, the system checks for a new contract, and if so, a new storage area for this contract is created by 337 to contain data similar to that listed in Table 1, row 2 and as described herein. Prior to inception of a contract, a "hold funds" or "inchoate" storage area is utilized. A contract transaction will occur when a subscriber pays a recommended premium to administrator for the increasing income product. Finally, as indicated at block 316 (FIG. 4), the system updates the contract storage area with the input data. With every new subscriber/beneficiary, contract parameters or conditions must be met, premiums to be made by a subscriber, increasing income plans selected (e.g. (a) pay income from inception to death; (b) delay payments for x years, then pay income until death; (c) pay a reduced income level for y years, then increase income to full "survivor" value until death), and (d) income target values for the contract selected. Further, if the product pays income from inception through death, invasion of principal parameters should be selected by the subscriber/beneficiary. The following Contract Matrix Table lists major parameters or elements to be selected. "ROI" refers to "return on investment" targets.

Contract Matrix Table

| Beneficiary/ROI | Income | Invasion of principal |
|---|---|---|
| n primary beneficiaries | now or after x years | no |
| n min'm Prime Ben. | whatever | yes |
| n min'm Prime Ben. | whatever | no |
| n max'm Prime Ben. | whatever | yes or no |
| n min'm and max'm plus ROI target | preferred % P (no guarantee) | probably no |
| n min's and max'm plus min'm ROI | within pre-set limits (inc. income capped) | probably no |
| n - plus min'm ROI | only min'm limit | yes |
| n - plus min'm ROI | no limits | yes |

By providing a variety of increasing income products for the same beneficiary contract group (e.g. males 50–52 years old), the administrator can provide an "aggressive" product (i.e., invasion of subscriber's principal, no upper limit on increasing income) and offer to the same subscriber/beneficiary a "conservative" product (i.e., no invasion of principal, income based exclusively on survivorship). Other combinations are possible as outlined above in the contract matrix table.

The following Premium Payment Table provides options for finding the financial product.

Premium Payment Plans lump sum
    periodic payments for term of years

Figure 6:
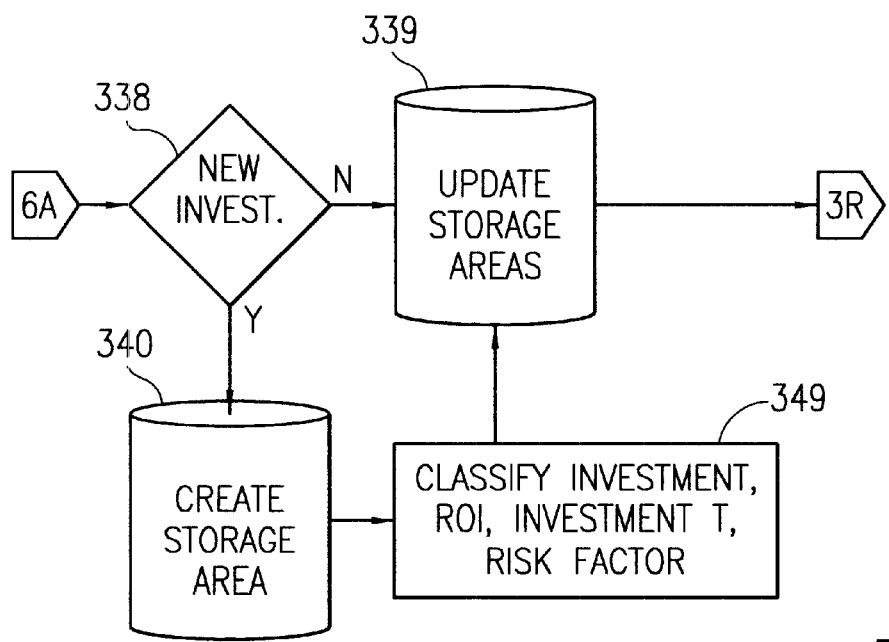

If an investment transaction has been detected, processing continues in FIG. 6 as indicated at label 6A. At block 338, the system checks for a new investments, and if so, a new storage area for this investment is created at block 340 to contain data similar to that listed in Table 1, row 4 and as set forth herein. A new investment will be utilized when the administrator decides that (a) the return on investment or "ROI" is insufficient; (b) the future ROI projections are insufficient; (c) the investment is liquidated in accordance with its customary terms (e.g., expiration of a certificate of deposit or an option); or (d) the projected ROI, plus or minus a tolerance factor and the economic forecast data shows an inability to meet contractual increasing income obligations. Block 349 classifies the investment as, for example, aggressive, intermediate, conservative, income generating or capital accumulation, sets investment time frame T and logs in data relating to risk factors (statistical analysis based upon investment benchmarks, e.g., volatility versus S & P 500 stock index.) Finally, as indicated at block 339, the system updates the investment storage area with the input data. Processing then returns to FIG. 3, as indicated at label 3R.

Figure 7:
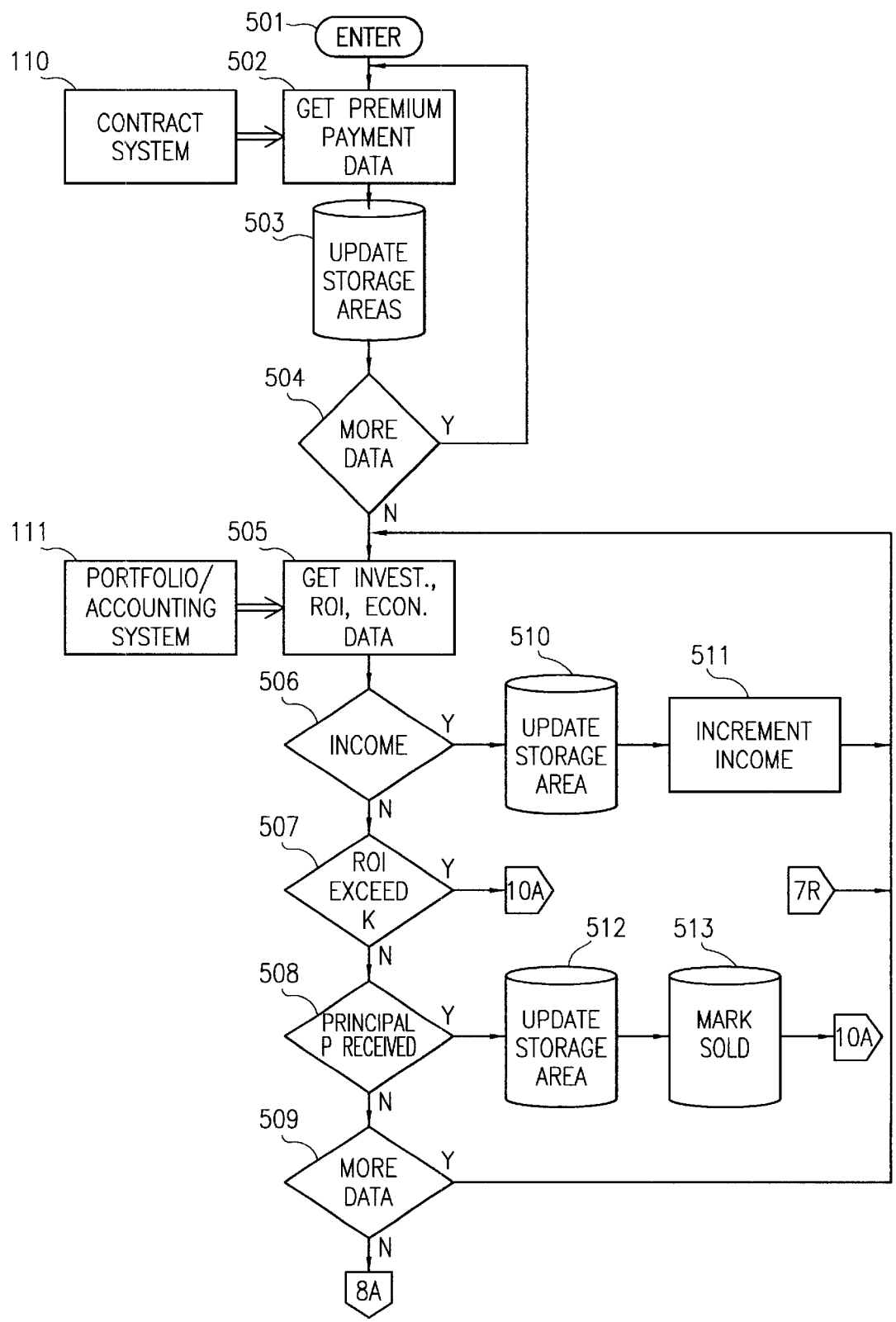
FIG. 7 is a flowchart depicting premium processing and investment processing systems.

A detailed description of the premium computation system and methodology is depicted in FIG. 7. Premium computation processing system begins at block 501 and ends at block 504, after which the system proceeds to the next sequential process. Beginning with a storage area fetch as indicated at block 502, the system proceeds through to block 503 in implementing a scan of all subscriber storage areas in disk storage 103. For each subscriber area, the process fetches all the contract data for this subscriber at block 502. A feature of this invention is this periodic update in steps and sub-systems 502, 503 inform each subscriber of progress towards income goals by reviewing contract premium commitments. As set forth above, some subscribers fund the financial product contract with a lump sum. This funding is expected to be typical. Others may fund the contract with periodic payments, in the nature of insurance financial products. If deficiencies are identified, the subscriber is informed and correction options recommended by report, as indicated at block 1002 in FIG. 13.

The investment performance system is depicted in FIG. 7, blocks 111, 505 through 513.

At block 505, the system obtains from external sources relevant economic forecasts, particularly inflation, interest rate, GDP and economic growth forecasts for future years. Additionally, the system obtains return or investment or ROI data in function block 505.

Data input at block 505 and the test at block 509 implement a loop to extract all portfolio and accounting investment data accumulated for this period (daily, weekly, monthly, etc.) from portfolio and accounting system 111. At blocks 506, 507, and 508, the system determines whether the payment of investment income is received, ROI exceeds the contract parameters, or principal is received (a) from a subscriber due to the purchase of the increasing income financial product; or (b) sale of an investment, respectively. For income received, as indicated at block 510, the system updates the income payment history for the particular investment in the storage area for the particular contract involved. Then, at block 511, the system accumulates the total income received by the benefit structure in this period by summing the income for all contracts. This information updates the system record, which contains data similar to Table 1, row 6.

Figure 10:
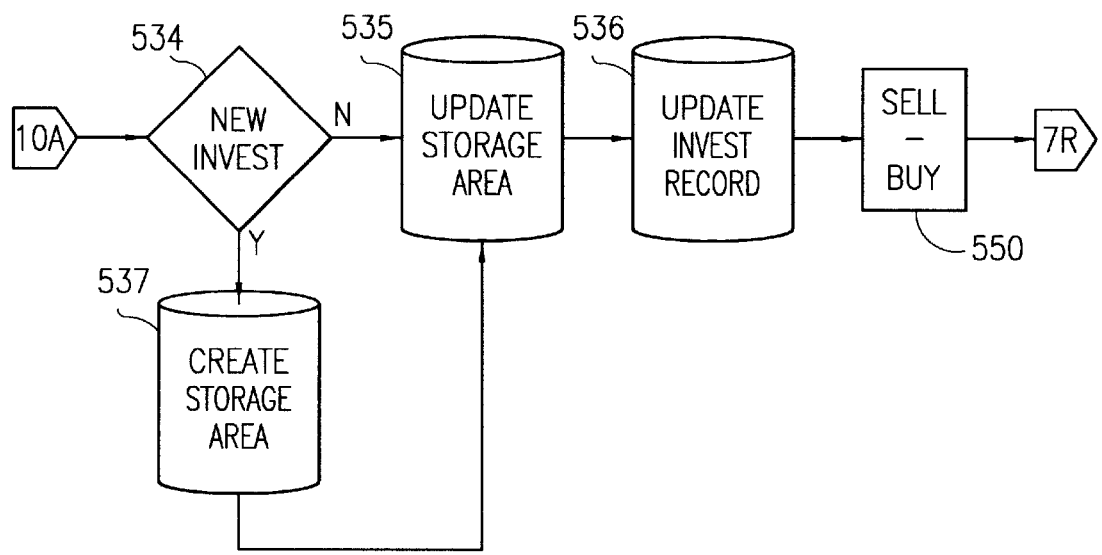

FIG. 7 is linked to FIG. 10 via link 10A. FIG. 10 depicts system processing for monitoring investment performance ROI. At block 534, the system determines whether a new investment is involved. If so, a storage area for the contract is updated at block 537 to mark the investment data as a "watch ROI" and list that "watch" or warning data with the data listed in Table 1, row 4. If the investment does not exceed ROI expectations (test 507, FIG. 7) and an old or a previous "watch ROI" is noted with the investment tested in block 534 or detected ROI is far below expectations, a new contract storage area is created at block 535 and the investment record storage area is updated by 536. ROI data is updated at block 536 to reflect the new information. Block 550 directs the financial product computer system to sell and buy investments to meet (a) actual increasing income target values with sufficient ROI (received investment income and/or realized capital gains from investments) and (b) projected income targets based upon actual plus projected ROI for investments.

For prospective economic and ROI analysis, the investment storage area is updated to reflect a possible "ROI watch" at block 513 to reflect the potentially new problem to meet the contractual commitments for increasing income.

Returning to FIG. 7, test block 508 determines whether investment principal has been received. Typically, this is due to the sale of an investment. However, the receipt of subscriber premiums also reflects the receipt of principal. The appropriate storage area is updated in block 512, and the investment is marked SOLD in 513. The system then jumps to FIG. 10, the sale, purchase and selection of new investments to meet (a) current income targets with current ROI; (b) projected targets with future ROI; and (c) redemption and sales of the product by subscribers. Current redemption and refunds may also be paid out of income.

As an added feature, the subscriber, primary beneficiary, and, in some cases, the secondary beneficiary may obtain a loan from the system administrator based upon the value of the financial product. This loan feature is similar to loans provided on whole life insurance policies.

Figure 8:
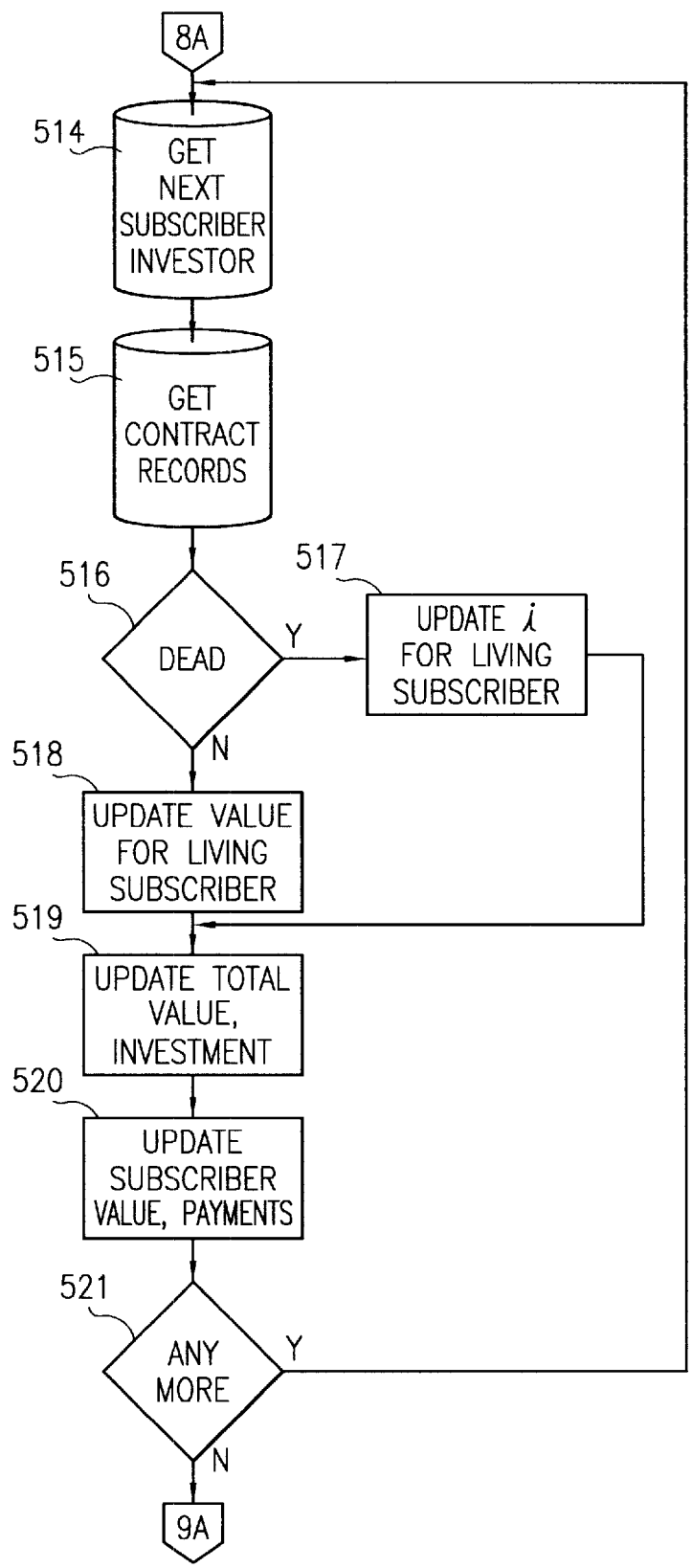
FIGS. 8, 9, 10 and 11A and 11B are flowcharts depicting processing and payment tracking systems, the system processing of current investments, new investments, increasing income payments and reporting the same as part of a portfolio/accounting system, and the processing of new contracts.

Turning now to FIG. 8, beginning with a storage area fetch as indicated at block 514, the system proceeds through block 521 to implement a scan of all subscriber storage areas stored in disk storage 103. For each subscriber area, process steps as indicated at blocks 515 to 520 are performed to determine the current value of each subscriber's or beneficiary's total investment in the benefit structure, the total value of the benefit configuration, and the net total of all subscriber payments. All the subscriber's contract storage areas are fetched at block 515. Subscriber net total payment is computed from these areas. The value of the total principal investment of a dead subscriber/beneficiary, tested at block 516, is simply the final principal balance of all subscriber owned contracts, which is updated at block 517. For a living subscriber/beneficiary, the current income "i" value of all contracts is computed, by means known to those of skill in the art, at block 518. The survivors in the contract group will receive greater income "i" payments due to the death of a contract group member. Alternatively, increasing income is paid out based upon mortality tables. At block 519, the subscriber total investment current value and net payments are updated. At block 519, all the subscriber values and payments are summed to obtain the total value of the investment structure and the total net payment into the structure. These values update the system record.

Figure 9:
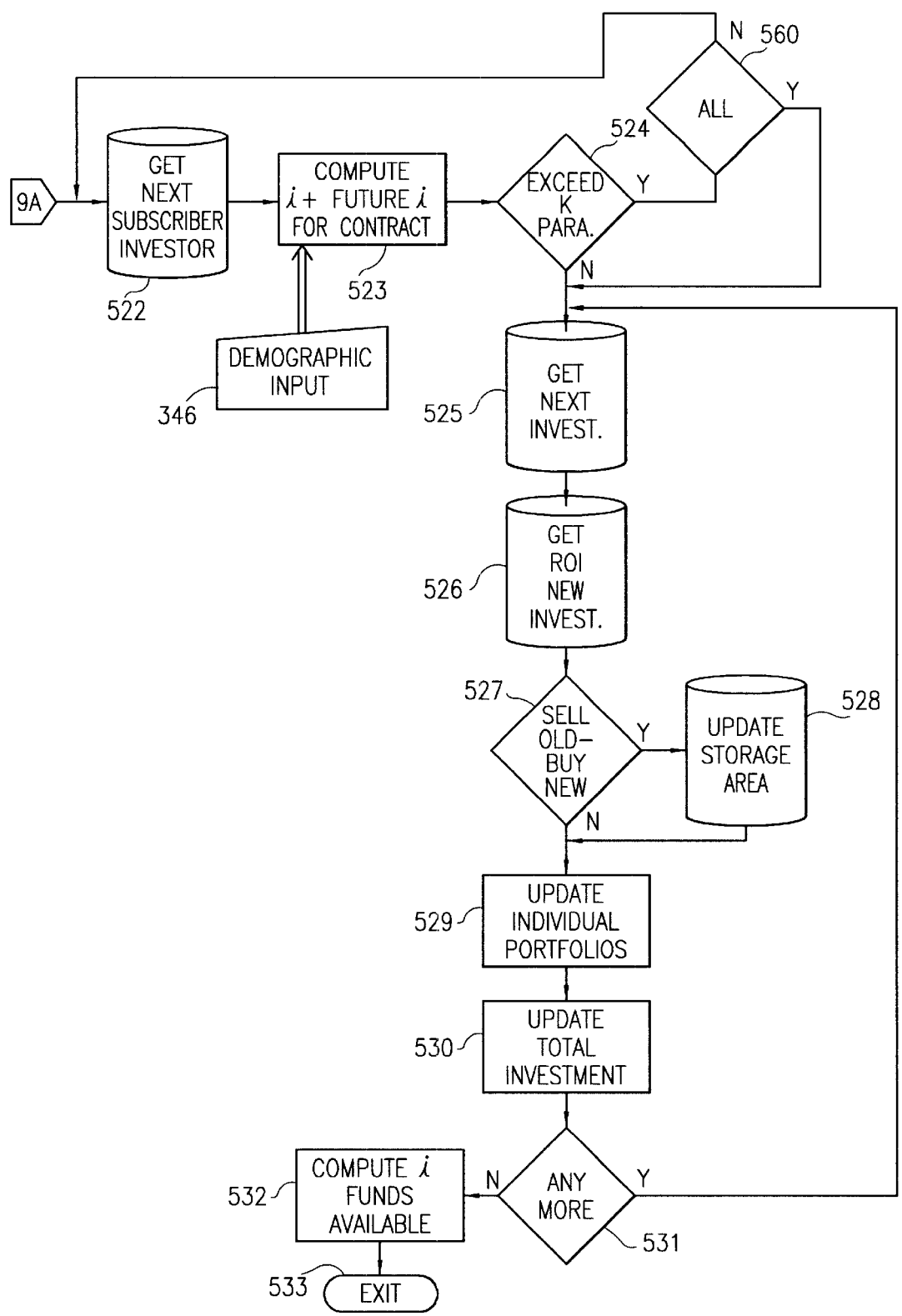

Payment tracking and demographic versus ROI and increasing income commitment processing system continues as depicted in FIG. 9. Beginning with a storage fetch at block 522, the system proceeds through block 524 and complete scan test 560 to implement another subscriber storage area scan during which each subscriber's/beneficiary's increasing income "i" from the benefit structure is computed at block 523. This is simply done by dividing the total value of investment group income by the total number of surviving subscribers/beneficiaries in the group. Economic factors, projected ROI and demographic data 346 are also accounted for by the input to block 523. That block computes current income commitments, funded by current ROI, future commitments which may be contingent upon the demographics or projected survival rate for the contract group dependent upon the contract parameters. Test 524 assures compliance with income target parameters, whether guaranteed or not, in the respective contracts.

Beginning with a storage area fetch at block 525, the system proceeds through block 531 to implement a scan of all investment storage areas stored in disk storage 103. For each investment area, process steps at blocks 526 to 530 are performed to determine the current ROI for each new investment in each contract group, the economic forecast relevant to the new investment and the increasing income commitment for that contract group. This process and subsystem establishes the stability of the benefit structure. This feature is carried out by fetching all ROI and relevant economic forecast data (if this forecast is included as part of the system) for each contract group as indicated at block 526. If an ROI of an investment does not exceed a target income level for a certain contract group (whether the income is guaranteed or simply estimated by the financial product administrator), a sell order is generated 527, a new investment is identified with an appropriate ROI and a buy order is generated. If contract funds are reinvested, at block 527, its storage area is deleted at block 528. The total of all individual investment portfolios from all the contract updates in the investment record are updated at block 529. The investment totals are then summed to compute the total system increasing income and principal values at block 530. This information updates the system record.

Finally the income generated funds from the investment are computed at block 532. This information also updates the system record.

Figure 11A:
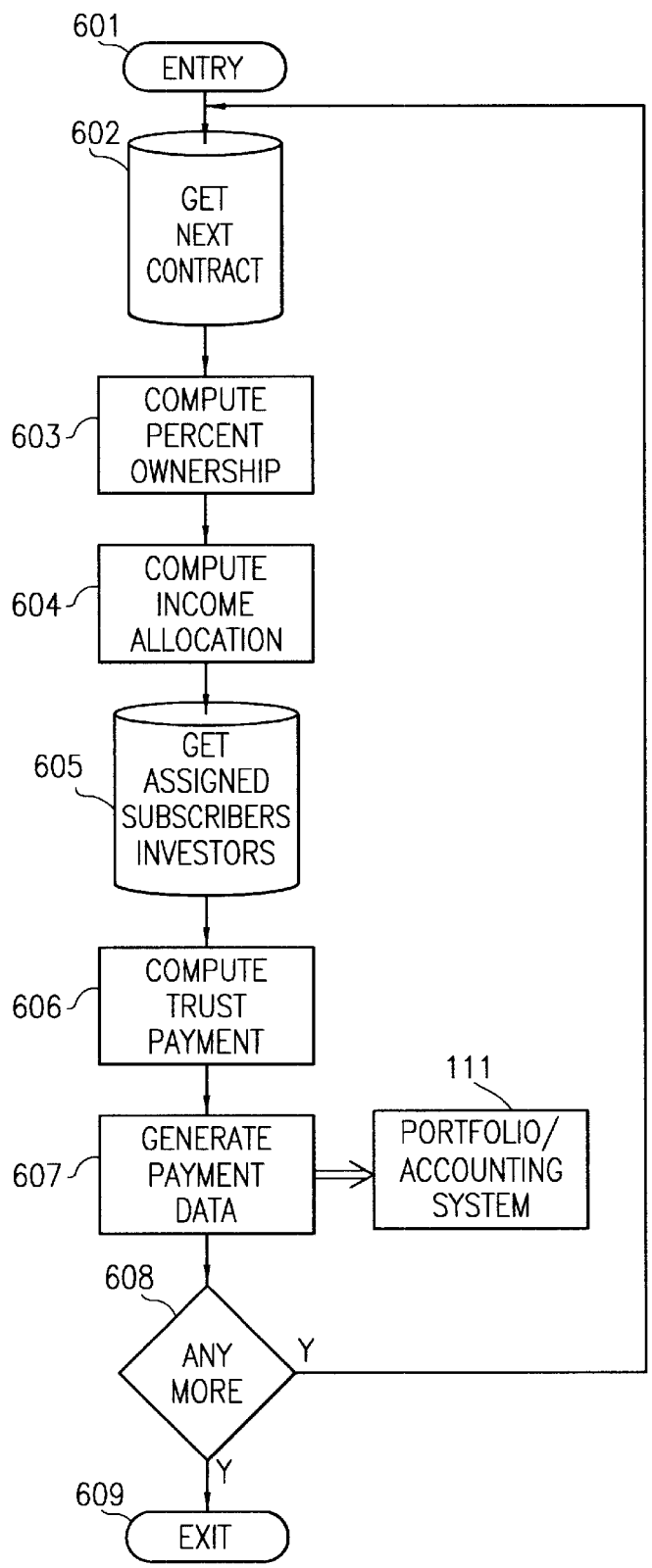
Figure 11B:
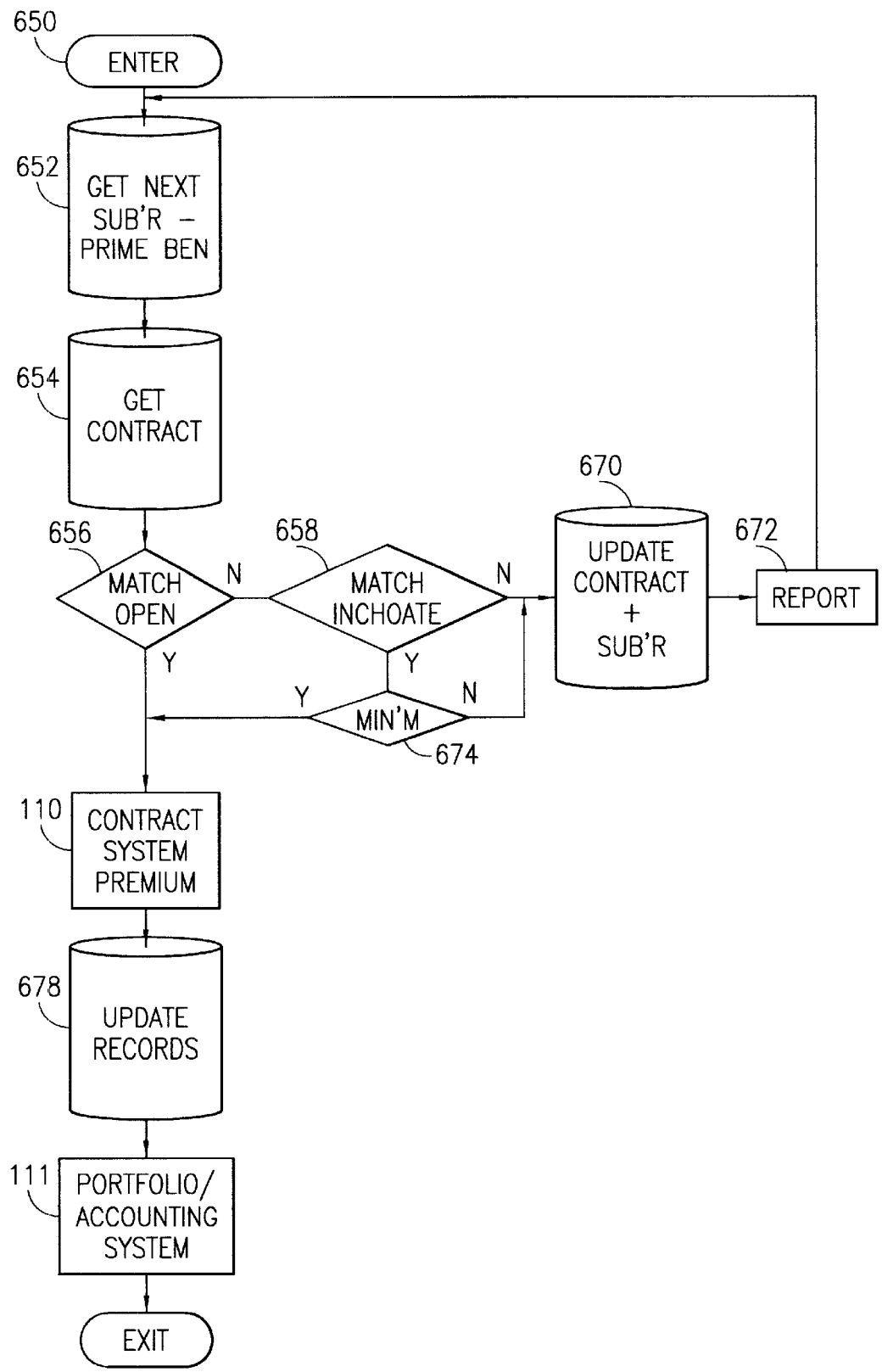
Figure 12:
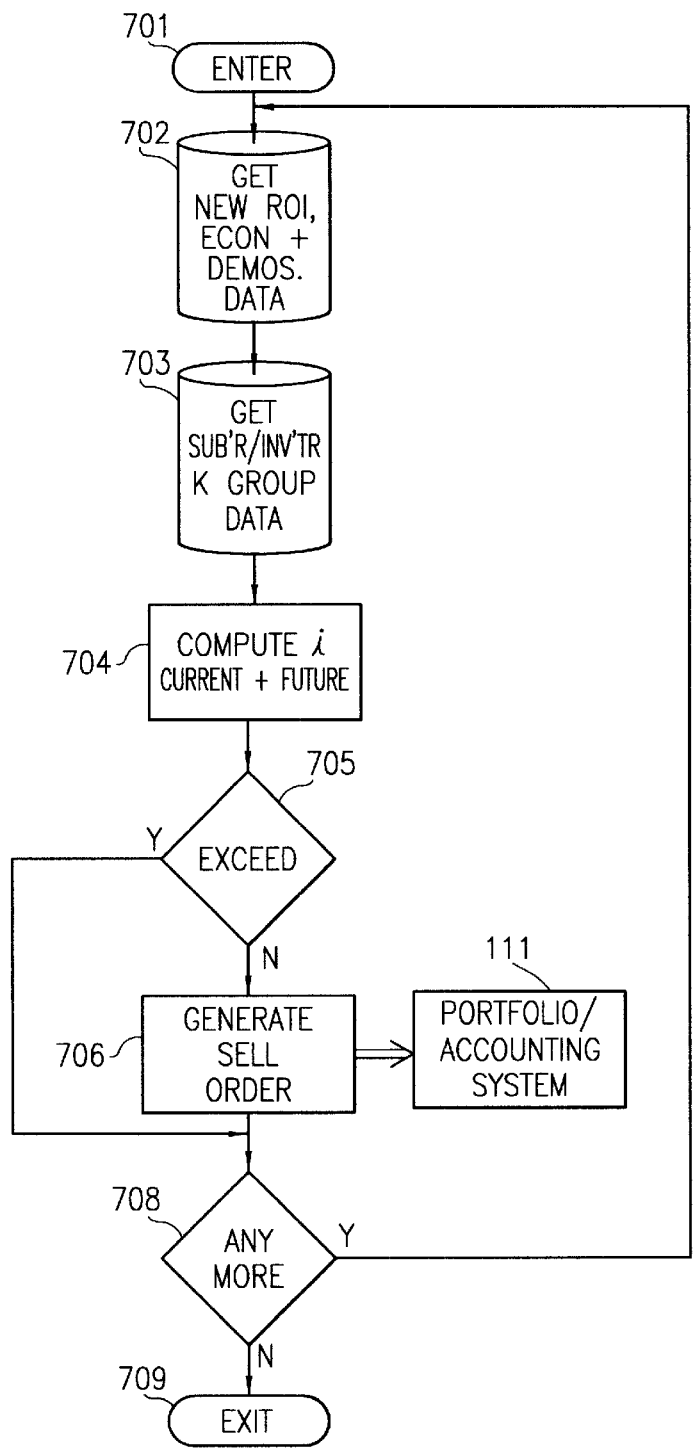
FIG. 12 is a flowchart depicting increasing income payment processing and investment processing to meet target increasing income levels.

FIGS. 11A, 11B and 12 are flowcharts depicting processing of increasing income payments and reporting of the portfolio/accounting system, processing new contracts, and increasing income payments processing and investment processing to meet income target values or target increasing income levels.

FIG. 11A and processing steps 602 through 607 review, each open contract which has been triggered and is in the "inception" period, computes the percent ownership of the subscriber/beneficiary, computes the income allocation from the find of money for the respective contract group, fetches the subscribers/beneficiaries' record, computes "i" payment (based upon actual survivorship or estimated survivorship) and generates payment data. The payment generation data is sent to portfolio/account system such that the administrator, via the computerized system for maintaining and monitoring the increasing income financial product, issues a paper or an electronic check to the surviving beneficiary associated with a particular contract group. The test 608 determines whether there are any additional open contracts subject to payment of the increasing income feature.

It should be noted that the contract, during the inception period, may have a "no-payment" period or a "constant level income" period. With a no-payment for a certain term of years contract, the income generated by the principal associated with a particular contract group accumulates during the quiet or "no payment" term thereby increasing the overall value to the contract group as well as to the beneficiaries. For example, an increasing income financial product purchased by a 30 year old may not pay any income for a period of 25 years, that is, until the subscriber/beneficiary reaches 55. All beneficiaries are 30 years old at inception. At this 55 year old age, the subscriber/beneficiary may be interested in retirement. During the 25 years, accumulated income greatly increases the total value of the financial product for the beneficiary. In contrast, a 50 year old purchasing the increasing income product may wish a "constant level" income stream from his or her investment for a period of 15 years. Thereafter, the investor/beneficiary may want an increasing income financial benefit from the financial product. In the case of a 30 year old when he or she reaches 55, the subscriber/beneficiary may want to activate the increasing income feature. Some of these concepts are set forth below in the First Tier Income Payment Plan Table.

First Tier (Income) Payment Plan Table increasing income based upon number of subscribers alive in contract group (full "i" return less % retainage less mgt.fee)

increasing income with floor or ceiling (with or without invasion of principal)

increasing income after term of years (elimination period T prior to i payments to primary beneficiaries)

increasing income for life of husband and wife, both designated as a primary beneficiary Upon the death of a primary beneficiary, the increasing income financial product may further include a contract parameter which provides some (a) benefit to the secondary beneficiary or beneficiaries (herein, reference will be made to a beneficiary however such reference also refers a plurality of beneficiaries); or (b) the ability of the secondary beneficiary to redeem the remaining value of the principal at an earlier time than the formal expiration of the contract. In the event of early redemption, the returned principal is greatly discounted. Redemption may be requested by the subscriber acting as a primary beneficiary or, in some cases such as an irrevokable trust, by the primary beneficiaries (with the approval of the secondary beneficiaries, if legally required) before the group contract "expires" per its terms. In the event of early redemption (which, under some circumstances, may be characterized as a "refund,") the distribution of invested funds to the party requesting the refund is greatly discounted. As described earlier, the contract may expire at (a) the death of all primary beneficiaries in a contract group, (b) a predetermined or preset time from inception of the contract; (c) a predetermined time from closure of the contract; (d) or any other contractually identified event; or (e) after a predetermined number of primary beneficiaries die. In the event the secondary beneficiary wishes to withdraw principal established by the initial subscriber prior to contract expiration, the following Second Tier or Intermediate Payment Plan Table provides some options for the redeeming party.

Second Tier (Intermediate) Payment Plan Table no payments until contract expires (death of subscribers or term of years)

nominal, periodic payments until contract expires lump sum payment fully discounted to reflect survivors in K group, present actuarial or demographic mortality rates and tables less % retainage At the expiration of the contract, the secondary beneficiary may be presented with several options regarding utilization of the principal. Some of these options are set forth in the Tertiary or Third Tier Payment Plan Table set forth below.

Tertiary or Third Tier Payment Plan Table lump sum annuity term of years or life any other legal distribution method with or without tax planning The secondary payment plans and tertiary payment plans may be implemented and offered as part of the computerized system to maintain the increasing income financial product at steps 319 through 323 in FIG. 4.

FIG. 11B provides a flowchart showing the major process steps for associating a contract or a contract group with a primary beneficiary established by a subscriber. Functional steps 652, 654 fetches subscriber and primary beneficiary data in contract data from the relevant record files. Test 656 determines whether an open contract matches with the demographics or characteristics of a primary beneficiary. If not, test 658 determines whether the primary beneficiary characteristics match any inchoate contracts. Inchoate contracts, as used herein, referred to contracts that have been placed "on hold" wherein the system administrator has accepted funding from a subscriber but has not opened a increasing income contract. Inchoate contracts refer to contracts which have not entered the inception phase due to minimum number of subscribers/beneficiaries minimum investment amounts or other reasons and further relates to contracts wherein the administrator has financial obligations to the funding subscribers prior to inception of the increasing income contract. Generally, those obligations include a return of funds. If no matches is found with the primary beneficiary and any existing contracts marked inchoate, the NO branch is taken and the contract and subscriber records are updated in process steps 670. A report is generated in step 672 both electronically and, preferably in print, indicating to the subscriber and the designated primary beneficiary of the incomplete or incipient nature of the increasing income contract. This enables the subscriber/beneficiary to request a refund or a redemption of his or her funds.

If an inchoate contract match is found, the system executes test 674 which determines whether the inchoate contract group exceeds the contract inception parameters. As stated earlier, these contract inception parameters may include minimum numbers of subscribers/beneficiaries, minimum total investment for a contract group, or other identifiable contractual parameters. If so, the system in test 674 executes the contract system premium function block 110. The same result is obtained from test 656 wherein a match is found between the primary beneficiary and any open increasing income contracts. Referring briefly to test 674, if the minimum inception parameters in a contract are not met, the system updates the relevant records in function block 670. The contract system function block 110 particularly identifies the premium payments as specified earlier in connection with FIG. 7. Function block 678 updates relevant records and function block 111 relating to the portfolio/accounting system and invests the new subscriber's funds with the other contract group members.

FIG. 12 shows a flowchart for monitoring contract funds in other to achieve income target values or target increasing income levels. As stated earlier, these increasing income targets may be guaranteed or may be simply suggested in the contractual terms established by the administrator. In function block 702, the system obtains new return on investment ROI information, new economic information and new demographic information as necessary to monitor the total investments and mix of investments by the administrator. Step 703 fetches subscriber/investor information in contract group data. The computation of increasing income in both a current sense and a future sense is determined in function block 704. Since a broad based increasing income financial product will require funds for redemption within 30–60–90 days as well as other exceptional circumstances (for example those set forth above in the secondary payment plan), it is advisable to maintain the financial stability of the financial product and to compute current cash flow needs for redemptions and increasing income contractual payments as well as long term payments. Step 704 recognizes that if financial products guarantee a minimum increasing income level through the life of a particular primary beneficiary group, the financial system must monitor the quality of return on investment for each investment and also monitor, for example, the death rate or demographic data of a particular contract group in order to meet the suggested or contractually implemented and/or guaranteed increasing income target levels.

Step 705 determines whether the current investments meet the income target values on the basis of each contract group as well as on the basis of the entire financial product system. If not, test 706 generates sell orders and activates the portfolio accounting system function block 111. If YES, the system tests in step 708 whether there are any additional investment items to be reviewed. The system exits in step 709.

Figure 13:
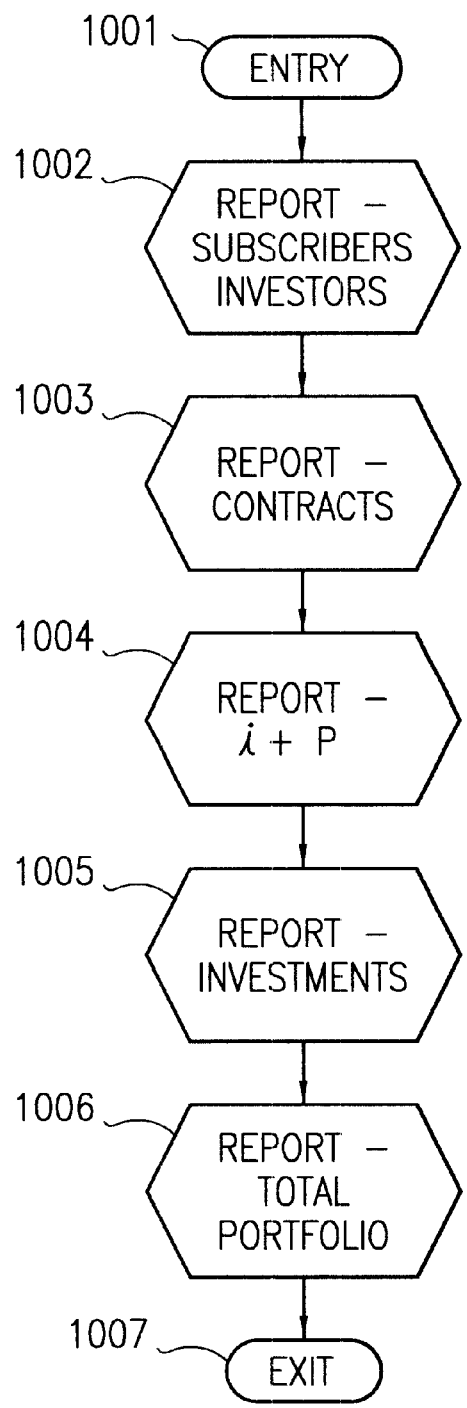
FIGS. 13 and 14 are flowcharts depicting investment report processing and housekeeping system.

A detailed description of the reporting means is depicted in FIG. 13. Reporting means processing begins at block 1001 and ends at block 1007, after which the system exits from its processing for this period, as indicated in FIG. 2 at block 212. Subprocess steps at blocks 1002 to 1006 generate reports on all entities stored by the system in disk storage 103. These entities are listed in Table 1 and shown in the drawing as subscriber/beneficiary/investor reports, (e.g. remaining beneficiaries) income "i" and principal "P" reports to specific beneficiaries, general reports on the condition of investments, and total portfolio performance (for system and specifically for investor).

Figure 14:
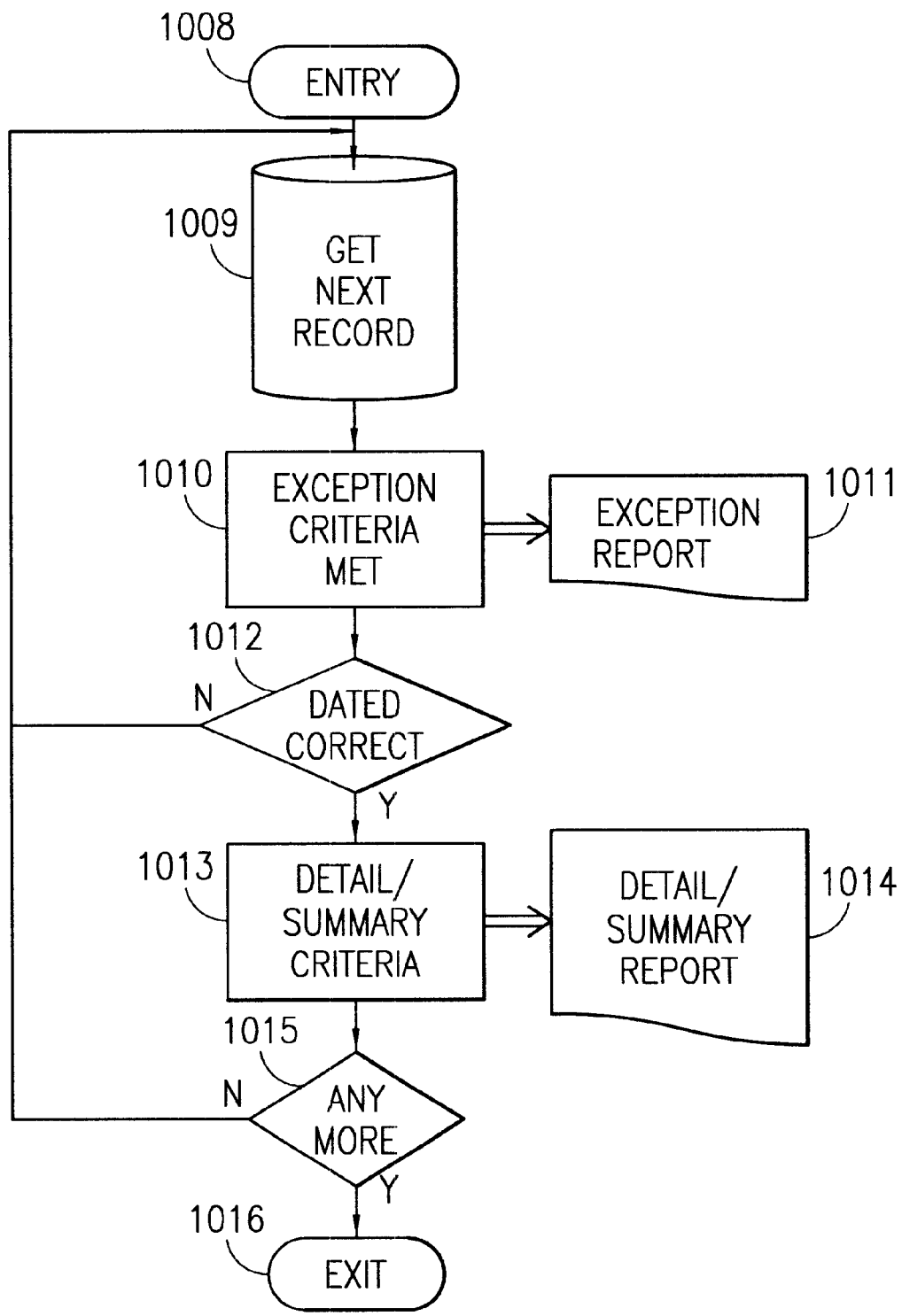

FIG. 14 details these report subprocesses, one for each type of entity. They begin processing at block 1008 and exit at block 1016. Beginning with a storage area fetch at block 1009, the system proceeds through block 1015 to implement a scan of all storage areas of the particular entity stored in disk storage 103. At block 1010, the system generates exception reports requiring immediate auditing or administrative attention. For example, exception conditions for subscribers may include a missed premium payment by subscriber/investor; for investments, an out of limit ROI condition, etc. For the correct date, which may be weekly, quarterly, yearly, etc., at block 1013 the system generates detail reports, for example listing all entity instances, and summary reports, for example providing totals of various quantities of interest.

FIG. 15 diagrammatically illustrates the flowchart or procedures for the self directed financial product. The entirety of the self directed product process may be implemented as a single module in the computer program system or the module and flowchart can be broken up and distributed throughout the other computer sub-routines and processes described herein. When the administrator offers the self directed (SD) financial product to the public and a subscriber seeking a new contract executes step 110 relating to the inquiry regarding a new contract, the process in step 1202 permits the subscriber to select the type of self-directed financial product he or she wishes. The following table provides some examples of certain self directed financial products. The term "self directed" refers to the ability of a subscriber or primary beneficiary to select either individual investments or investment strategies.

Self Directed Investments Table listed investment (e.g., blue chip equity, mutual funds, high grade bonds, CDs, index finds or trusts) - [subscriber picks one or more listed investments]

completely self directed (excluding high risk options, derivatives, pink sheet equities, bulletin board equities, bonds having rating lower than BB, non-U.S. equities, etc.) [subscriber picks any investment-system excludes certain unacceptable investments]

aggressive high risk, high return portfolio management (similar to an aggressive, high risk mutual fund)

moderate risk-return portfolio conservative risk-return portfolio

As is apparent from the Self Directed Investments Table, the subscriber may simply select an investment portfolio strategy such that the subscriber is willing to accept the risk and the potential benefits of an aggressive portfolio management style, a moderate portfolio management style or a conservative portfolio management style. These terms (e.g. "aggressive") have generally accepted meanings in the financial community especially as the terms relate to mutual finds (see Lipper mutual funds ratings) and various ratings of U.S. and foreign equities. Otherwise, the investor may self direct his or her investment by selecting equities or various other financial products from a select list. Further, the subscriber may be permitted to invest in a wide range of financial products excluding certain very high risk products. The list of excluded investments is not meant to be limiting or to describe all types of excluded investments. Based upon the popularity of the increasing income financial product, there may be sufficient demand in the marketplace to provide a large pool of subscribers/beneficiaries for a high risk, self directed financial product providing increasing income features. These high risk financial products may include foreign equities, options, derivatives and other very high risk financial products. Presently, the limiting factor seems to be the number of subscribers or primary beneficiaries which are placed in a designated contract group and which are willing to accept the high risk nature of a self directed financial product wherein each of the subscriber/primary beneficiaries could select very high risk financial products to fund the increasing income contract fund. Others in the pool may not select such high risk investments.

Returning to FIG. 15, at step 1204, the administrator sets performance parameters for the new contract selected by the subscriber based upon the demographics in the contract group and based upon the demographics of the primary beneficiary elected by the subscriber. Step 1206 updates the records as explained above regarding subscriber information, beneficiary information and invested funds and contract information. Step 1208 recognizes input from portfolio system input 111.

In step 1208, the administrator obtains investment data for the SD or self directed contract. Step 1210 determines whether income has been received from the SD investment. If YES, the system goes to FIG. 7, step 510 as noted in jump step 1211. If NO, the system determines, in decision step 1212, whether principal has been received from the SD investment. If YES, the system goes, in step 1213, to FIG. 7, step 512. The output from steps 1211 and 1213 follow the NO branch from decision step 1212.

Decision step 1214 determines whether the SD investment's return on investment (ROI) is within contract ROI parameters. These parameters, as explained later in connection step 1220 and 1226, are bracket limits providing a minimum ROI level and a maximum ROI level. If the self directed investment ROI is within the upper and lower ROI brackets (established in step 1204 at the beginning of a contract), the YES branch is taken from decision step 1214 and subsequent decision step 1216 determines whether there is any additional data. If YES, the system jumps to the main program in jump step 1218. If NO, the program module ends.

If the SD investment ROI is outside the bracketed minimum and maximum contract ROI parameters, the NO branch is taken from decision step 1214. Decision step 1220 determines whether the ROI is greater than the contract ROI parameter. If so, step 1222 pours over or transfers the excess ROI, whether income or principal, to a supplemental account established for the subscriber/beneficiary. Step 1224 permits the subscriber/primary beneficiary to redeem the supplemental account or reinvest that supplemental account pursuant to earlier instructions received in steps 110, 1202 and 1204. The remaining balance is assigned to the subscriber's primary increasing income account. The system ends after execution of step 1224. If the supplemental account or excess SD ROI funds are reinvested, the reinvestment will follow the self directed investment instructions originally obtained from the subscriber or the primary beneficiary. For example, the subscriber/primary beneficiary may recommend that all dividends in excess of the bracketed ROI be swept into a money market account. When the money market account reaches a predetermined value, for example, $10,000.00, the $10,000.00 would be invested in a blue chip stock. Otherwise, the excess ROI could be distributed on a quarterly basis directly to the subscriber/primary beneficiary as part of his or her increasing income or separately, apart from any increasing income. For example, if the increasing income was only to be paid to primary beneficiaries ten years or more after the inception of the contract, the subscriber/primary beneficiary may obtain distributions on a monthly, quarterly or annual basis from the system administrator for the excess SD ROI based on exemplary or superlative investment instructions by the subscriber/primary beneficiary. The high limit is a superlative ROI limit triggering a bookkeeping transfer to the subscriber's supplemental account. Decision step 1220 establishes the test for superlative ROI for the self directed investment instruction obtained from the subscriber or primary beneficiary.

Returning to decision step 1220, if the SD ROI does not exceed the high limit bracket for the contract group, the NO branch is taken and the system executes step 1226 which determines whether the ROI is less than the minimum threshold contract value. If the ROI is not less than the minimum, the NO branch is taken and the system executes error step 1227. It should be apparent that the ROI must fall within the contract parameter brackets, above those brackets or below those brackets. Hence, error 1227 is a required output from the NO branch of decision 1226.

If the SD ROI is less than the contract parameter, the YES branch is taken and, in step 1228 the computer program generates a call for additional funds from the subscriber/primary beneficiary. This call may constitute an electronic transmission or communication, a telephone call or a letter demanding additional premiums or moneys from the investor to maintain the self directed account at the appropriate level and to keep it in general balance and equity with the similarly situated primary beneficiaries in the specified contract group. In step 1230, the computer system disables the self directed investment feature for that particular subscriber. In step 1232, the computer system determines whether additional moneys have been received. If YES, the system in step 1233 reinstates the SD status and, subsequent thereto, the program ends. If the subscriber or primary beneficiary does not deliver additional funds to the system administrator, the system in step 1232 confirms the failure to obtain additional funds and, in step 1234 liquidates the investments of the subscriber/primary beneficiary less a certain percentage or administrative fee.

The administrative fee and percentage is placed in a pool with the funds of the other contract group members in order to compensate the surviving members of the contract group for the lost of the principal. In other words, the subscriber, who is permitted to self direct his investment funds, should not be able to reap the benefits of the increasing income feature without a penalty since he or she no longer participates in the system because his or her investments do not meet the minimum return on investment (ROI) required for the contract funds. As stated earlier, the contract is funded based upon the assumption that each subscriber deposits a certain amount of principal into the fund. That principal generates a return on investment or ROI within certain parameters over a number of years. The increasing amount of the return on investment is ultimately distributed to the primary beneficiaries initially enlisted in the fund. As the primary beneficiaries die or per a mortality table, the remaining beneficiaries obtain increasing income due to their better survival rate. If an SD subscriber fails to maintain the appropriate return on investment in the contract fund, and if the subscriber is forced to liquidate because of his failure, the fund should be compensated for the lack of principal represented by that errant SD subscriber. Step 1236 distributes the liquidated investment less the appropriate retainer or percentage and administrative fee to the subscriber. The program subsequently ends.

FIG. 16 provides a basic flowchart showing how instructions are received from the SD subscriber or primary beneficiary. As stated earlier, many subscribers designate themselves as the primary beneficiary of the increasing income fund. To simplify the description of FIG. 16, reference will be made to "a subscriber" even though the proper designation may be "primary beneficiary" at a certain time. Step 1302 accepts an input from portfolio system input 111. In step 1302, the computer system confirms that the subscriber has an SD or self directed investment account. In step 1304, the system confirms that the SD account is within contract parameters established at the inception of contract for the contract group. In step 1308, input is obtained in the form of subscriber investment instructions as noted by input 1306. Step 1308 confirms that the investment recommended by the subscriber is on the approved list of investments. Other investment controls are discussed earlier. Step 1310 obtains return on investment or ROI data on the new investment based on the instruction of the subscriber. Step 1310 also confirms that the past ROI for the recommended investment and the future ROI for the recommended investment generally conforms with the ROI contract parameters. Decision step 1312 determines whether the subscriber's investment recommendation and all other earlier steps 1302, 1304, 1308 and 1310 are appropriate and approved. If not, the system in step 1314 generates an error message to the subscriber and subsequently ends. If decision 1312 is YES, the system goes to FIG. 10 in jump step 1313 which is the buy-sell investment process.

If the SD subscriber selected a portfolio management style (e.g., aggressive), the system administrator would either (a) manage the funds following the selected management style or (b) turn over fund management to an investment advisor (e.g., Goldman Sachs). The monitoring of SD ROI is similar.

The financial product and the computer-based system and processes described herein can be modified by providing partial periodic return of principal to primary beneficiaries over a certain term of the contract. This periodic payment of certain amounts of principal is similar to payments made to annuity beneficiaries. As used herein, the payment of principal includes this feature, if necessary or desirable. In a similar manner, the financial product of the present invention may include a life insurance component, insuring the life of the primary beneficiary.

This insurance feature for annuity products is known in the financial industry.

As a further improvement, the financial product described herein may include a life insurance component and a contractual provision that if the value of the principle investment declines and the primary beneficiary dies, the remaining beneficiaries are guaranteed a distribution of the initial investment.

This life insurance guarantee feature is currently found in some variable annuity products.

These life insurance features can be included in the increasing income financial product described herein.

In order to fund the increasing income financial product, the subscriber has various payment plans. The subscriber could make periodic payments to the fund administrator. Those periodic payments may run for a certain number of years or may be payable to the fund administrator until the beneficiary is a certain age. The following Subscriber Payment Plan Table lists some of these payment options.

Figure 17:
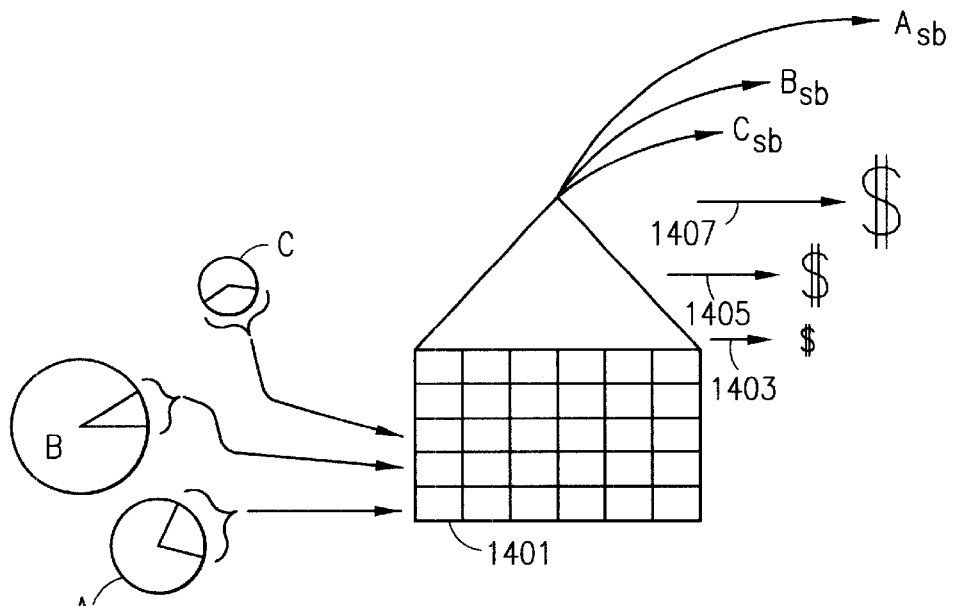
FIGS. 17, 18A and 18B diagrammatically illustrate funding the financial product with pledged assets, periodic premium payments accompanied by a pledged asset account and the administration of the pledged assets after death of primary beneficiaries A, B and C.

Subscriber Payment Plan Table lump sum
periodic payments for x years
periodic payments until beneficiary is y years old
pledge (full or partial account)
pledge and pay premiums
   for x years
   up to $m amount total
   up to $n amount per year Another funding mechanism utilizes the pledge of all or part of a subscriber's financial asset. For example, if the subscriber has a brokerage account with a brokerage house, and the account has a balance of $250,000.00, the subscriber may pledge $100,000.00 of that account to the increasing income financial product. This pledge of all or part of the subscriber's financial asset or account is diagrammatically illustrated in FIG. 17. With a plurality of pledged assets, represented by the squares, one of which is square 1401, the financial product is created. When the primary beneficiary associated with the subscriber who pledged his or her assets dies, the fund administrator obtains the pledged assets and takes control of that financial fund. Further, income from the acquired fund is then paid to the surviving primary beneficiaries as shown by arrow 1403. As additional primary beneficiaries in the contract group die, additional amounts of increasing income are paid as shown by arrow 1405. When there are very few surviving primary beneficiaries, a greater amount of income is distributed as shown by arrow 1407 and the large $ associated therewith. When all the primary beneficiaries die or upon the occurrence of the expiration parameter associated with the group contract, the principal of the increasing income fund is distributed to the secondary beneficiaries of subscribers/primary beneficiaries A, B, C. These secondary beneficiaries are identified as $A_{sb}$, $B_{sb}$, and $C_{sb}$.

Figure 18A:
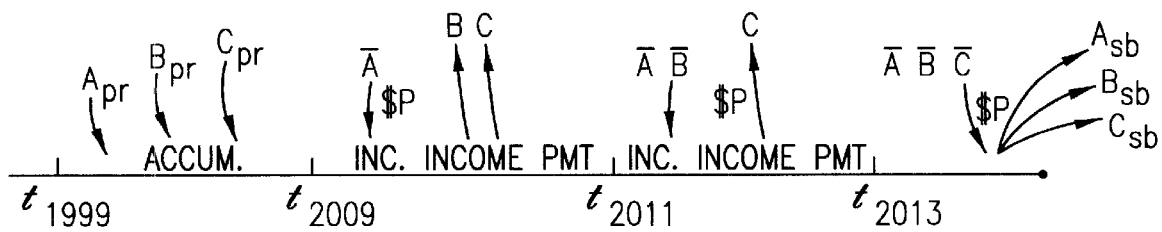

FIG. 18A diagrammatically illustrates the payment and initial distribution of increasing income (ii) and the final distribution of the principal of the increasing income fund. At a time period between 1999 and 2009, subscribers funding the program for a primary beneficiaries A, B and C pay premium into the increasing income product. These premiums are accumulated during that time period 1999–2009. After time 2009, primary beneficiary A dies (represented by the symbol "bar A") and the subscriber who pledged his or her financial assets is required to turn over those assets to the fund. The fund administrator may file a lien on the subscriber's assets prior to that time (before A dies) to secure its interests. Further, the time period from t-2009 through t-2011 is an increasing income payment period such that increasing income is paid to primary beneficiaries B, C. After time 2011, the primary beneficiary B dies (as shown by bar B) and the pledged assets are delivered to the increasing income fund administrator. The primary beneficiary C continues to receive increasing income payments. After time 2013, primary beneficiary C dies, pledged assets associated with that primary beneficiary are put under the control of the fund administrator and, if C is the last surviving primary beneficiary, the fund principal is distributed to the secondary beneficiaries of A, B and C or otherwise as specified by the contract.

Figure 18B:
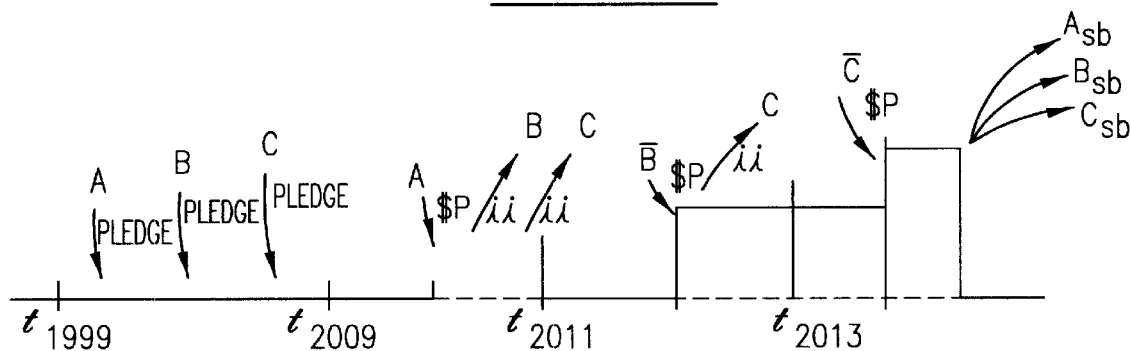

FIG. 18B diagrammatically shows the operation of the system with pledges made by subscriber or primary beneficiaries A, B and C. At some point intermediate time 2009 and time 2011, primary beneficiary A dies as shown by bar A. Increasing income ii is paid to primary beneficiaries B, C. After time 2011, the primary beneficiary B dies and his or her pledged assets are placed in the increasing income fund. Primary beneficiary C receives increasing income ii at that time. After time 2013, primary beneficiary C dies and his or her pledged assets are placed under the control of the fund administrator. At some time thereafter, depending upon the contractually established expiration parameters, the fund is distributed to the secondary beneficiaries of A, B and C.

Figure 19:
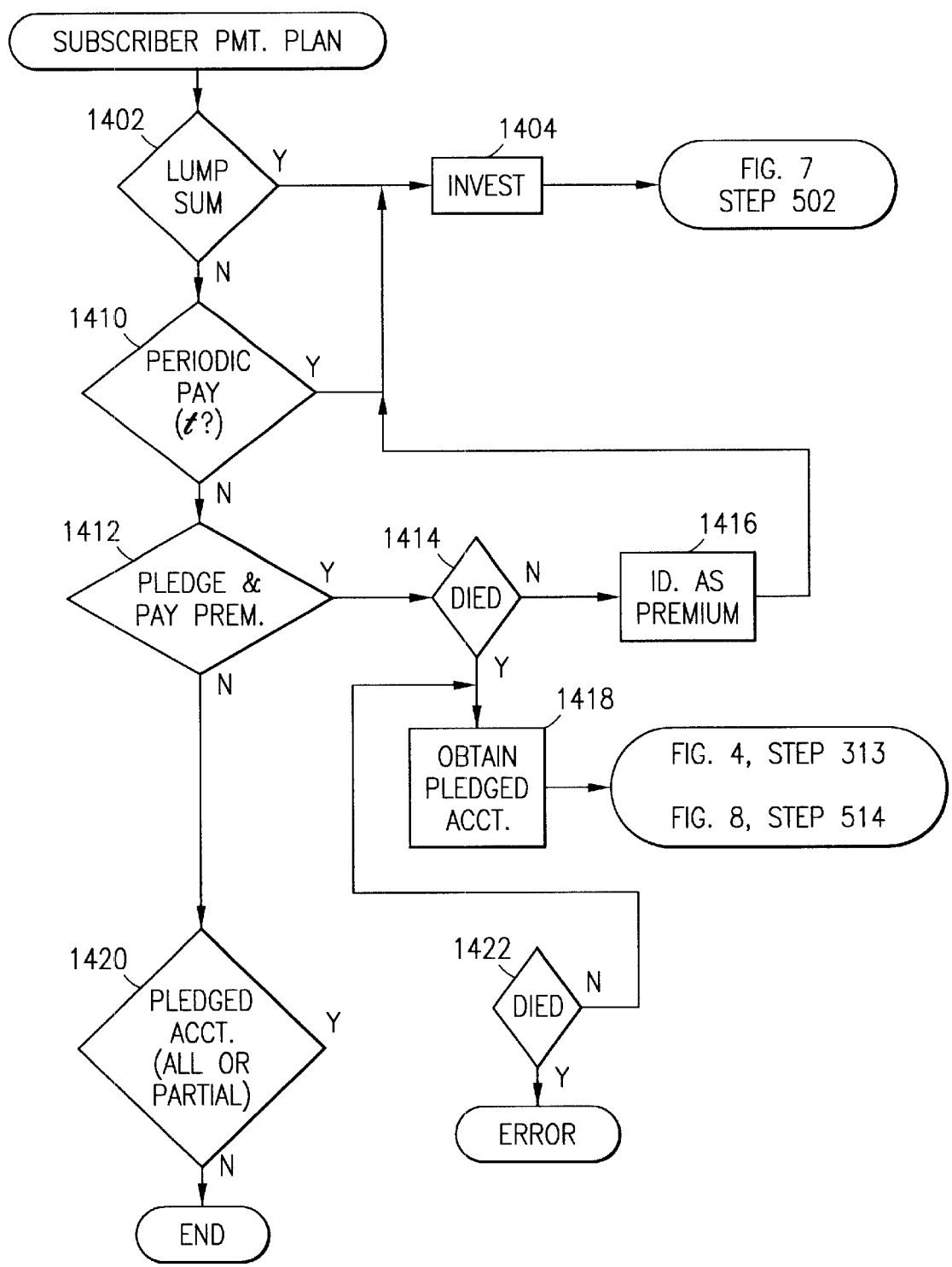
FIG. 19 diagrammatically illustrates a flow chart showing an exemplary subscriber payment plan routine in accordance with the principles of the present invention.

FIG. 19 diagrammatically illustrates a flowchart showing an example of the subscriber payment routine program. Decision step 1402 determines whether the subscriber has delivered a lump sum payment for the increasing income product. If the YES branch is taken, the system in step 1404 invests the money and jumps to FIG. 7, step 502. As explained earlier in connection with FIG. 7, that step logs in the premium payment, updates records and processes the payment accordingly.

If the NO branch is taken from decision step 1402, the program executes decision step 1410 which determines whether the subscriber is making the payment under a periodic payment plan. It should be noted that the periodic payment plan may be limited to a certain time period or a certain age of the primary beneficiary (see "t?" in FIG. 19) The system checks the time and frequency of the periodic payment. If the YES branch is taken from decision step 1410, the system returns to investment step 1404. If the NO branch is taken from decision step 1410, the system executes decision step 1412 which determines whether the subscriber is making a pledge of financial assets and paying periodic premiums. If the YES branch is taken from decision step 1412, the system determines in decision step 1414 whether the primary beneficiary associated with that payment has died. If the NO branch is taken, the system identifies the payment as a premium payment in step 1416 and returns to investment step 1404. If the YES branch is taken from decision step 1414 indicating that the primary beneficiary has died, the system in step 1418 obtains the pledged financial account or asset. The subscriber may pledge all of an account or part of an account. After obtaining the pledged account in step 1418, the system jumps to FIG. 4, step 313 or FIG. 8 step 514, both of which essentially process that investment and recognize that the primary beneficiary associated with that subscriber has died.

Returning to decision step 1412, if the NO branch is taken, the system determines in decision step 1420 whether the subscriber has pledged part or all of his or her financial assets. If the YES branch is taken, the system in decision step 1422 determines whether the primary beneficiary for that subscriber has died. If so, the YES branch is taken and the system executes step 1418 which obtains the pledged account. If the NO branch is taken, the system executes an error routine. If the NO branch is taken from decision step 1420, the routine ends.

This claims appended hereto are meant to cover modifications and changes within the scope and spirit of the present invention.

What is claimed is:

1. A computerized method for monitoring and maintaining a financial product, purchased by a plurality of subscribers, paying increasing income to a plurality of primary beneficiaries based upon their comparable survival in a predetermined group including the steps of:

providing at least one computer system for processing transactions, including subscriber payments and increasing income payments, and for reporting the status of beneficiary accounts, said subscriber payments including one form of payment from the group of a lump sum, periodic payments, a pledge of a subscriber's financial asset, and a pledge of a subscriber's financial asset accompanied with periodic payments;

monitoring, via said at least one computer system, the establishment of a plurality of contracts for a corresponding plurality of primary beneficiaries, each primary beneficiary of said plurality of primary beneficiaries designating a corresponding secondary beneficiary;

monitoring, via said at least one computer system, said subscriber payments and obtaining, in the event of a death of a respective beneficiary associated with a corresponding subscriber's pledge, said corresponding subscriber's financial asset pledged as payment;

segregating said plurality of primary beneficiaries into a plurality of contract groups, each contract group utilizing one contract of said plurality of contracts, wherein each primary beneficiary of a respective contract group has (i) substantially similar demographics as compared with others in the same contract group, and (ii) a substantially similar contract compared with others in the same contract group;

monitoring, via said at least one computer system, compliance with contractual parameters which parameters define unique attributes of a respective contract of said plurality of contracts for said respective contract group, said contractual parameters including:
  (i) a beginning of an increasing income payment period,
  (ii) an expiration parameter representing an ending of said increasing income payment period,
  (iii) the presence or absence of an income target value, and,
  (iv) the presence or absence of an invasion of principal parameter;

monitoring, via said at least one computer system, an investment of funds created by said subscriber payments on behalf of said primary beneficiaries in compliance with said contractual parameters for said plurality of contracts;

directing and reporting, via said at least one computer system, the payment of increasing income to primary beneficiaries surviving others in said respective contract group of said plurality of contract groups; and, directing and reporting, via said at least one computer system, the payment of principal to said secondary beneficiaries upon the occurrence of said expiration parameter for said respective contract group.

2. A method as claimed in claim 1 wherein the step of monitoring investments is processed substantially independently with respect to the steps of monitoring the establishment of the contracts, processing subscriber payments and directing payment of said increasing income.

3. A method as claimed in claim 1 wherein the beginning and an ending of an increasing income payment period includes at least one inception contractual parameter and a closure contractual parameter.

4. A method as claimed in claim 1 wherein said expiration parameter includes the step of determining at least one from the group of (i) whether all primary beneficiaries have died; (ii) a predetermined time has past since said beginning of said increasing income payment period; (iii) the occurrence of a predetermined contractual event.

5. A method as claimed in claim 1 wherein said step of monitoring the presence or absence of said income target value includes monitoring factors relative to at least two from the group of income generation from a predetermined investment, realized capital gain, unrealized capital gain, prospective capital gain, and a time factor associated with said predetermined investment.

6. A method as claimed in claim 2 wherein the beginning and an ending of an increasing income payment period includes at least one inception contractual parameter and a closure contractual parameter.

7. A method as claimed in claim 6 wherein said expiration parameter includes the step of determining at least one from the group of (i) whether all primary beneficiaries have died; (ii) a predetermined time has past since said beginning of said increasing income payment period; (iii) the occurrence of a predetermined contractual event.

8. A method as claimed in claim 7 wherein said step of monitoring the presence or absence of said income target value includes monitoring factors relative to at least two from the group of income generation from a predetermined investment, realized capital gain, unrealized capital gain, prospective capital gain, and a time factor associated with said predetermined investment.

9. A method as claimed in claim 1 including the step of providing at least two interconnected computer systems and wherein the steps of processing transactions, subscriber payments, increasing income payments, and reporting the status of beneficiary accounts are executed by one of said two computer systems and wherein the step of monitoring the investment of funds is executed by the other of said two computer systems.

10. A method as claimed in claim 9 including the step of establishing a telecommunications link between said two interconnected computer systems to exchange data relative to said processing transactions and said monitoring the investment of funds.

11. A method as claimed in claim 1 wherein said plurality of contracts is one of an irrevocable trust contract, an annuity contract, a life insurance contract, a contract establishing a closed end mutual fund, a limited partnership contract, and any other type of legal contractual structure, and said monitoring and compliance step maintaining compliance with contractual parameters establishing said one contract.

12. A method as claimed in claim 11 wherein said annuity contract is one of a life annuity, an annuity for a term of years, an annuity for a life plus a survivor's life, an annuity for a life plus a survivor's life limited by term of years. and said monitoring and compliance step maintaining compliance with contractual parameters establishing said one annuity contract.

13. A method of monitoring and maintaining a financial product, purchased by a plurality of subscribers, paying increasing income to a plurality of primary beneficiaries based upon their comparable survival in a predetermined group including the steps of:

obtaining subscriber payments for funding said increasing income financial product, said subscriber payments including one form of payment from the group of a lump sum, periodic payments, a pledge of a subscriber's financial asset, and a pledge of a subscriber's financial asset accompanied with periodic payments;

establishing a plurality of contracts for a corresponding plurality of primary beneficiaries, each primary beneficiary of said plurality of primary beneficiaries designating a corresponding secondary beneficiary;

monitoring said subscriber payments and obtaining, in the event of a death of a respective beneficiary associated with a corresponding subscriber's pledge, said corresponding subscriber's financial asset pledged as payment;

segregating said plurality of primary beneficiaries into a plurality of contract groups, each contract group utilizing one contract of said plurality of contracts, wherein each primary beneficiary of a respective contract group has (i) substantially similar demographics as compared with others in the same contract group, and (ii) a substantially similar contract compared with others in the same contract group;

assuring compliance with contractual parameters which parameters define unique attributes of a respective contract of said plurality of contracts, said contractual parameters including:
 (i) a beginning of an increasing income payment period,
 (ii) an expiration parameter representing an ending of said increasing income payment period,
 (iii) the presence or absence of an income target value, and,
 (iv) the presence or absence of an invasion of principal parameter;

directing the investment of funds created by said subscriber payments for said plurality of contracts;

directing and reporting the payment of increasing income to primary beneficiaries surviving others in said respective contract group of said plurality of contract groups; and, directing and reporting the payment of principal to said secondary beneficiaries upon the occurrence of said expiration parameter for said respective contract group.

14. A method as claimed in claim 13 wherein the step of assuring compliance with the contractual parameter of said income target valve utilizes factors relative to income generation from a predetermined investment, prospective and realized capital gain, and an investment time factor associated with said predetermined investment.

15. A method as claimed in claim 13 including the step of assuring compliance with a closure contractual parameter, said closure contractual parameter including one from the group of a maximum number of primary beneficiaries in said contract group, a total monetary limit associated with said respective contract for said respective contract group, and a predetermined time period.

16. A method as claimed in claim 13 wherein said contractual parameter relative to said beginning of an increasing income payment period is an inception parameter, said inception parameter is at least one parameter from the group including a minimum number of primary beneficiaries in said contract group, a minimum monetary limit associated with said respective contract for said respective contract group, a predetermined time from acceptance of payment from a subscriber on behalf of a primary beneficiary, and any contractually defined event.

17. A method as claimed in claim 16 wherein, in said step of assuring compliance, said inception parameter correlates to a beginning of an accumulation of income time period which will, at some time in the future, support increasing income payments to surviving primary beneficiaries in a respective contract group.

18. A method as claimed in claim 17 wherein said step of assuring compliance includes assuring compliance with a contractual closure parameter, said closure parameter including one from the group of a maximum number of primary beneficiaries in said contract group, a total monetary limit associated with said respective contract for said respective contract group, and a predetermined time period, said closure parameter relating to a predetermined closure event which, as a result thereof, said administrator is con-

27 tractually prohibited from placing additional primary beneficiaries into said respective contract group.

19. A method as claimed in claim 18 wherein, in said step of assuring compliance, said expiration parameter relates to said end of said accumulation of income time period and payment of increasing income payments to surviving primary beneficiaries in a respective contract group, and an occurrence of said expiration parameter event triggering said step of directing and reporting the payment of principal.

20. A method as claimed in claim 19 wherein, in said step of assuring compliance, said income target value utilizes factors including income generation from a predetermined investment, prospective and realized capital gain, and an investment time factor associated with said predetermined investment.

21. A method as claimed in claim 20 wherein, in said step of assuring compliance, said invasion of principal parameter relates to said administrator utilizing said subscriber payments to pay increasing income to primary beneficiaries surviving others in said respective contract group.

22. A method as claimed in claim 13 including the step of investing said funds created by said subscriber payments in accordance with said contractual parameters, said step of investing said funds is executed substantially independently with respect to the steps of establishing a plurality of contracts, obtaining subscriber payments and directing payment of said increasing income.

23. A method as claimed in claim 13 wherein said expiration parameter includes the step of determining at least one from the group of (i) whether all primary beneficiaries have died; (ii) a predetermined time has past since said beginning of said increasing income payment period; (iii) the occurrence of a predetermined contractual event.

24. A method as claimed in claim 13 wherein said step assuring compliance with said contractual parameter of the presence or absence of said income target value includes monitoring factors relative to at least two from the group of income generation from a predetermined investment, realized capital gain, unrealized capital gain, prospective capital gain, and a time factor associated with said predetermined investment.

25. A method for establishing a financial product, purchased by a plurality of subscribers, paying increasing income to a plurality of primary beneficiaries based upon their comparable survival, the method comprising:

subscriber payments including one form of payment from the group of a lump sum, periodic payments, a pledge of a subscriber's financial asset, and a pledge of a subscriber's financial asset accompanied with periodic payments;

monitoring said subscriber payments and, in the event of a death of a respective beneficiary associated with a corresponding subscriber's pledge, obtaining or directing the obtainment of said corresponding subscriber's financial asset pledged as payment;

segregating said plurality of primary beneficiaries into a plurality of groups having similar actuarial characteristics;

assuring compliance with contractual parameters for each group, said contractual parameters including:
 (i) a beginning of an increasing income payment period,
 (ii) an expiration of said increasing income payment period,
 (iii) the presence or absence of an income target value, and,
 (iv) the presence or absence of an invasion of principal parameter;

directing the investment of finds created by said subscriber payments on behalf of said primary beneficiaries in compliance with said contractual parameters; and directing the payment of increasing income to primary beneficiaries surviving others in said respective group.

26. A method as claimed in claim 25 wherein each primary beneficiary designates a corresponding secondary beneficiary and the method includes directing the payment of principal to said secondary beneficiaries upon the occurrence of the expiration parameter for said respective group and wherein the step of directing investments occurs substantially independently with respect to the steps of processing subscriber payments and directing payment of said increasing income.

27. A method as claimed in claim 25 wherein assuring compliance with said expiration parameter includes the step of determining at least one from the group of (i) whether all primary beneficiaries have died; (ii) a predetermined time has past since said beginning of said increasing income payment period; (iii) the occurrence of a predetermined contractual event.

28. A method as claimed in claim 25 including the step of providing at least two interconnected computer systems and wherein the steps of processing transactions, subscriber payments, increasing income payments, and reporting the status of beneficiary accounts are executed by one of said two computer systems and wherein the step of directing the investment of funds is executed by the other of said two computer systems.

29. A method as claimed in claim 28 including the step of establishing a telecommunications link between said two interconnected computer systems to exchange data relative to said processing transactions and said monitoring the investment of funds.

30. A method of establishing a financial product, purchased by a plurality of subscribers making payments for funding said increasing income financial product, the subscriber payments including one form of payment from the group of a lump sum, periodic payments, a pledge of a subscriber's financial asset, and a pledge of a subscriber's financial asset accompanied with periodic payments, the financial product paying increasing income to a plurality of primary beneficiaries based upon their comparable survival, the method comprising:

monitoring said subscriber payments and, in the event of a death of a respective beneficiary associated with a corresponding subscriber's pledge, obtaining or directing the obtainment of said corresponding subscriber's financial asset pledged as payment;

segregating said plurality of primary beneficiaries into a plurality of groups having similar actuarial characteristics;

assuring compliance with contractual parameters for each group, said contractual parameters including:
 (i) a beginning of an increasing income payment period,
 (ii) an expiration of said increasing income payment period,
 (iii) the presence or absence of an income target value, and,
 (iv) the presence or absence of an invasion of principal parameter;

directing the investment of funds created by said subscriber payments; and directing the payment of increasing income to primary beneficiaries surviving others in said respective group.

31. A method as claimed in claim 30 wherein each primary beneficiary designates a corresponding secondary beneficiary and the method includes directing the payment of principal to said secondary beneficiaries upon the occurrence of the expiration parameter for said respective group and wherein the step of assuring compliance with the contractual parameter of said income target valve utilizes factors relative to income generation from a predetermined investment, prospective and realized capital gain, and an investment time factor associated with said predetermined investment.

32. A method as claimed in claim 30 including the step of assuring compliance with a closure contractual parameter, said closure contractual parameter including one from the group of a maximum number of primary beneficiaries in said group, a total monetary limit associated with said respective group, and a predetermined time period.

33. A method as claimed in claim 30 wherein said contractual parameter relative to said beginning of an increasing income payment period is an inception parameter, said inception parameter is at least one parameter from the group including a minimum number of primary beneficiaries in said group, a minimum monetary limit associated with said respective group, a predetermined time from acceptance of payment from a subscriber on behalf of a primary beneficiary, and any contractually defined event.

34. A method as claimed in claim 33 wherein, in said step of assuring compliance, said income target value utilizes factors including income generation from a predetermined investment, prospective and realized capital gain, and an investment time factor associated with said predetermined investment.

35. A method as claimed in claim 34 wherein, in said step of assuring compliance, said invasion of principal parameter relates to said administrator utilizing said subscriber payments to pay increasing income to primary beneficiaries surviving others in said respective contract group.

36. A method as claimed in claim 30 wherein said expiration parameter includes the step of determining at least one from the group of (i) whether all primary beneficiaries have died; (ii) a predetermined time has past since said beginning of said increasing income payment period; (iii) the occurrence of a predetermined contractual event.

37. A method as claimed in claim 30 wherein said step assuring compliance with said contractual parameter of the presence or absence of said income target value includes monitoring factors relative to at least two from the group of income generation from a predetermined investment, realized capital gain, unrealized capital gain, prospective capital gain, and a time factor associated with said predetermined investment.

* * * * *